(12) United States Patent
Nishioka

(10) Patent No.: US 11,093,775 B2
(45) Date of Patent: Aug. 17, 2021

(54) INFORMATION PROCESSING APPARATUS AND NON-TRANSITORY COMPUTER READABLE MEDIUM STORING PROGRAM

(71) Applicant: FUJIFILM Business Innovation Corp., Tokyo (JP)

(72) Inventor: Shintaro Nishioka, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/255,841

(22) Filed: Jan. 24, 2019

(65) Prior Publication Data

US 2020/0097746 A1 Mar. 26, 2020

(30) Foreign Application Priority Data

Sep. 25, 2018 (JP) .............................. JP2018-179372

(51) Int. Cl.
| | | |
|---|---|---|
| *G06K 9/03* | (2006.01) | |
| *G06K 9/00* | (2006.01) | |
| *G06F 3/0484* | (2013.01) | |
| *G06F 40/174* | (2020.01) | |

(52) U.S. Cl.
CPC ............ *G06K 9/033* (2013.01); *G06F 3/0484* (2013.01); *G06F 40/174* (2020.01); *G06K 9/00449* (2013.01); *G06K 9/00456* (2013.01); *G06K 2209/01* (2013.01)

(58) Field of Classification Search
CPC ............... G06K 9/033; G06K 9/00449; G06K 9/00456; G06K 2209/01; G06K 9/03; G06K 9/00442; G06K 9/222; G06K 9/00436; G06F 40/174; G06F 3/0484; G06T 7/00
See application file for complete search history.

(56) References Cited

U.S. PATENT DOCUMENTS

| | | | |
|---|---|---|---|
| 2004/0021700 A1* | 2/2004 | Iwema ................... | G06K 9/033 715/863 |
| 2010/0086210 A1* | 4/2010 | Tzadok .............. | G06K 9/00442 382/195 |

FOREIGN PATENT DOCUMENTS

JP 2016212812 12/2016

OTHER PUBLICATIONS

JP2016212812A Shunichi et al, machine translated (Year: 2016).*

* cited by examiner

*Primary Examiner* — Jianxun Yang
(74) *Attorney, Agent, or Firm* — JCIPRNET

(57) ABSTRACT

An information processing apparatus includes an obtaining unit that obtains image data and a recognition result, the image data being data obtained by digitizing a document including plural areas in one document, the recognition result being a result obtained by recognizing the image data, and a control unit that performs control to display an area image corresponding to each of the plural areas in the image data obtained by the obtaining unit and an area recognition result corresponding to each of the plural areas in the recognition result in accordance with a display mode predetermined according to a degree of necessity of a confirming operation corresponding to each of the plural areas.

17 Claims, 20 Drawing Sheets

FIG. 5

FORM DEFINITION SCREEN — 60

BLANK FORM — 62A, 62

RECOGNITION FRAME INFORMATION — 62B

| | |
|---|---|
| FRAME TYPE | ONE LINE FRAME TEXT |
| FRAME NAME | RECIPIENT SEAL |
| FRAME COORDINATES | 1212, 502, 184, 86 |
| TEXT TYPE | |
| CERTAINTY FACTOR THRESHOLD VALUE | 0.7 |
| CONFIRMATION CORRECTION | UNNECESSARY ▼ |

Drop-down candidates: UNNECESSARY / NECESSARY

- CANDIDATE DISPLAY IN DROP-DOWN SELECTION
- ITEM IN SELECTED STATE IS HIGHLIGHTED

FIG. 6

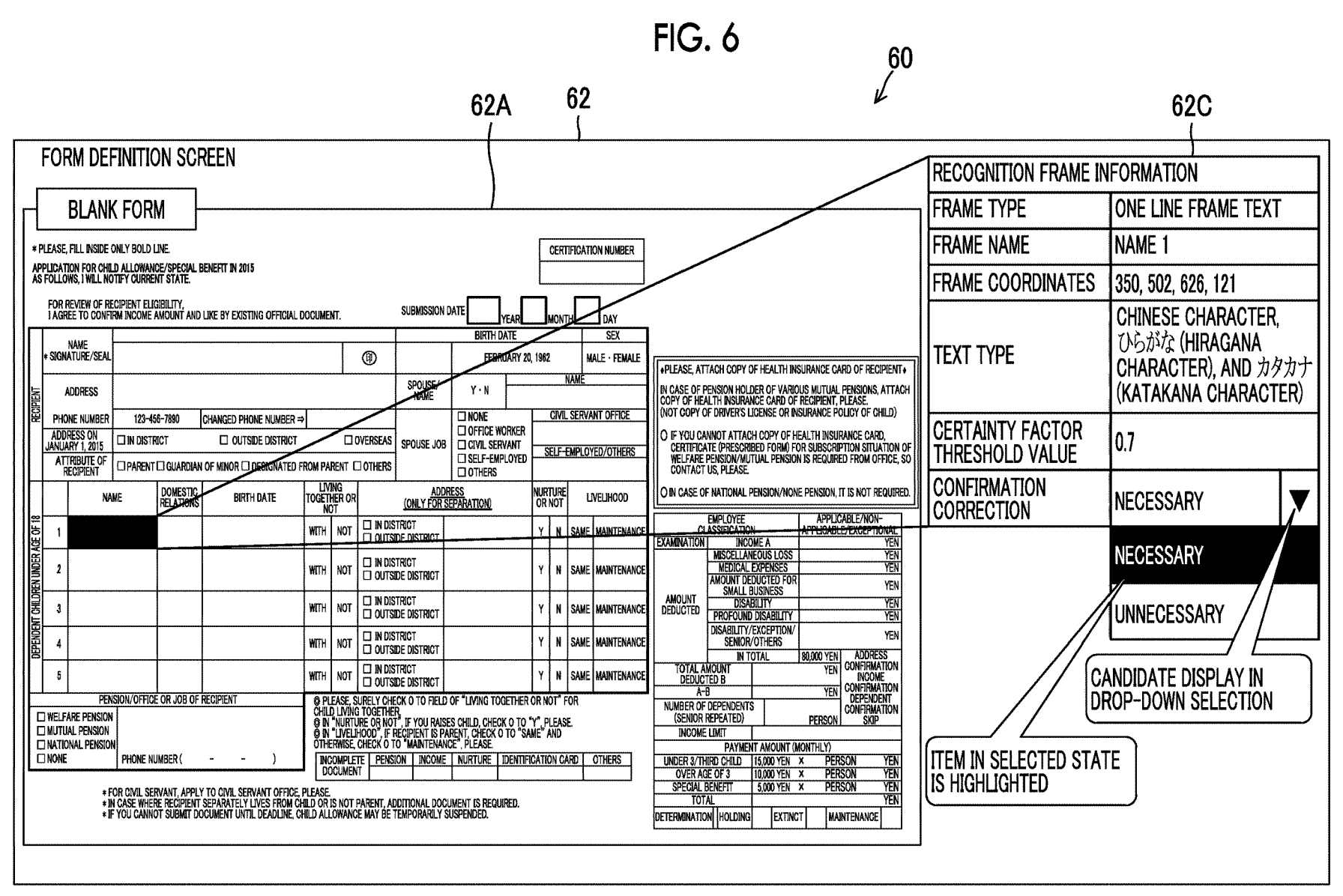

FORM DEFINITION SCREEN

RECOGNITION FRAME INFORMATION

| FRAME TYPE | ONE LINE FRAME TEXT |
|---|---|
| FRAME NAME | NAME 1 |
| FRAME COORDINATES | 350, 502, 626, 121 |
| TEXT TYPE | CHINESE CHARACTER, ひらがな (HIRAGANA CHARACTER), AND カタカナ (KATAKANA CHARACTER) |
| CERTAINTY FACTOR THRESHOLD VALUE | 0.7 |
| CONFIRMATION CORRECTION | NECESSARY ▼ |

Drop-down options:
- NECESSARY (ITEM IN SELECTED STATE IS HIGHLIGHTED)
- UNNECESSARY

CANDIDATE DISPLAY IN DROP-DOWN SELECTION

FIG. 7

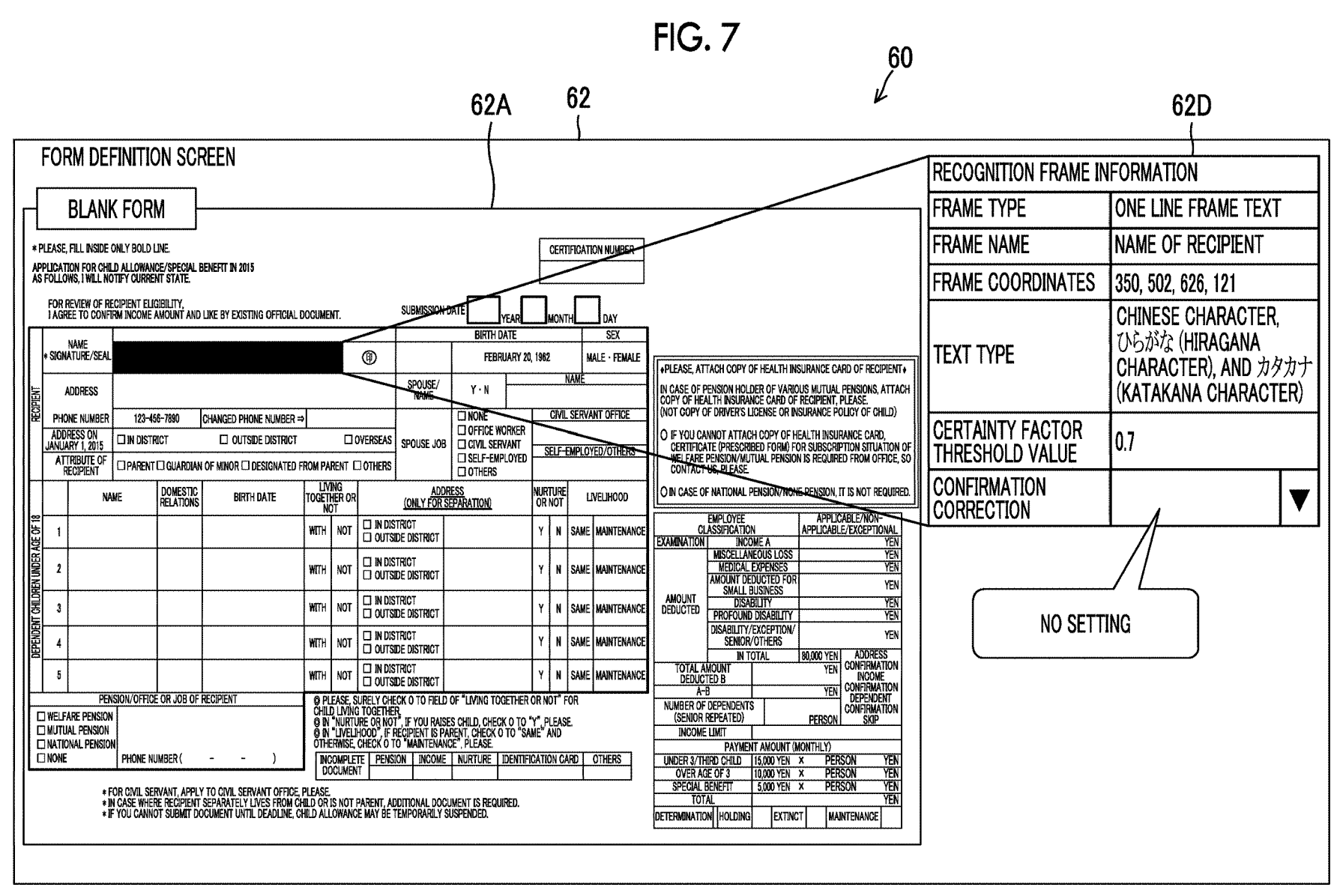

FORM DEFINITION SCREEN — 60

BLANK FORM — 62A, 62

RECOGNITION FRAME INFORMATION — 62D

| RECOGNITION FRAME INFORMATION | |
|---|---|
| FRAME TYPE | ONE LINE FRAME TEXT |
| FRAME NAME | NAME OF RECIPIENT |
| FRAME COORDINATES | 350, 502, 626, 121 |
| TEXT TYPE | CHINESE CHARACTER, ひらがな (HIRAGANA CHARACTER), AND カタカナ (KATAKANA CHARACTER) |
| CERTAINTY FACTOR THRESHOLD VALUE | 0.7 |
| CONFIRMATION CORRECTION | NO SETTING |

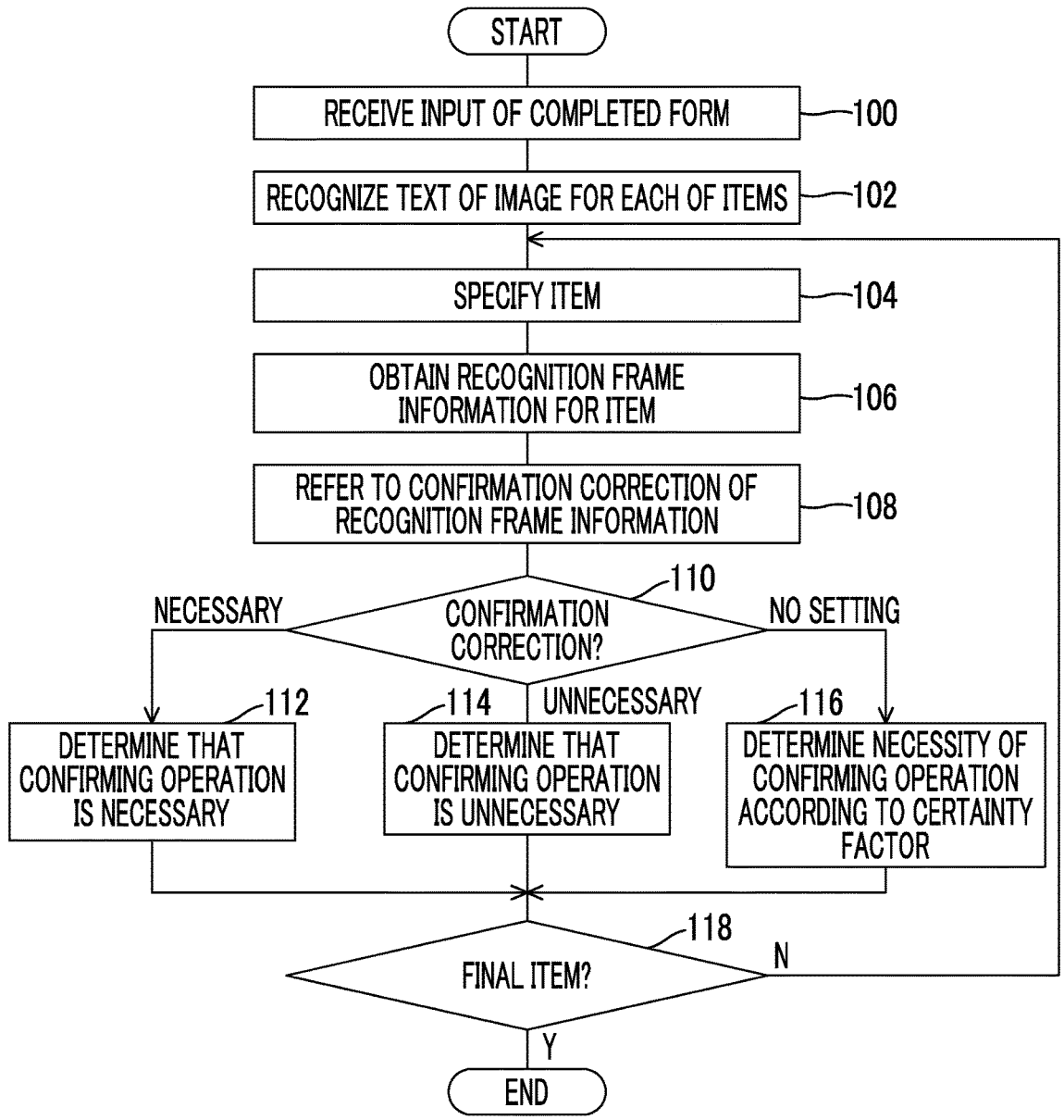

FIG. 10

CONFIRMATION/CORRECTION SCREEN

COMPLETED FORM — 42A

| ITEM NAME | TEXT IMAGE /RECOGNITION RESULT ▽ | CERTAINTY FACTOR ▽ |
|---|---|---|
| NAME OF RECIPIENT | *Fuji Taro* | 95% |
| RECIPIENT SEAL | (Fuji) | 55% "UNNECESSARY" |
| NAME 1 | *Fuji Minato* / Fuji Minato | 92% "NECESSARY" |
| ...... | | ...... |

42B

Callouts on form:
- OMITTED SINCE CERTAINTY FACTOR IS EQUAL TO OR LARGER THAN THRESHOLD VALUE
- OMITTED SINCE CONFIRMATION CORRECTION OF "UNNECESSARY" IS SET
- EXECUTED SINCE CONFIRMATION CORRECTION OF "NECESSARY" IS SET

[ CONFIRM ] [ TEMPORARY STORE ] [ CLOSE ]

*PLEASE, FILL INSIDE ONLY BOLD LINE.

APPLICATION FOR CHILD ALLOWANCE/SPECIAL BENEFIT IN 2015
AS FOLLOWS, I WILL NOTIFY CURRENT STATE.

FOR REVIEW OF RECIPIENT ELIGIBILITY,
I AGREE TO CONFIRM INCOME AMOUNT AND LIKE BY EXISTING OFFICIAL DOCUMENT.

SUBMISSION DATE: 2015 YEAR / 3 MONTH / 15 DAY

CERTIFICATION NUMBER: [ ]

RECIPIENT

| NAME *SIGNATURE/SEAL | Fuji Taro | ㊞ | BIRTH DATE | FEBRUARY 20, 1962 | SEX | (MALE) · FEMALE |
|---|---|---|---|---|---|---|
| ADDRESS | 6-1 Minatomirai, Nishi-ku, Yokohama-shi, Kanagawa, Japan | | SPOUSE/NAME | | NAME | Fuji Hanako |
| PHONE NUMBER | 123-456-7890 | CHANGED PHONE NUMBER ⇒ | | | | |
| ADDRESS ON JANUARY 1, 2015 | ☑ IN DISTRICT ☐ OUTSIDE DISTRICT ☐ OVERSEAS | | SPOUSE JOB | ☑ NONE ☐ OFFICE WORKER ☐ CIVIL SERVANT ☐ SELF-EMPLOYED ☐ OTHERS | CIVIL SERVANT OFFICE | SELF-EMPLOYED/OTHERS |
| ATTRIBUTE OF RECIPIENT | ☑ PARENT ☐ GUARDIAN OF MINOR ☐ DESIGNATED FROM PARENT ☐ OTHERS | | | | | |

DEPENDENT CHILDREN UNDER AGE OF 18

| | NAME | DOMESTIC RELATIONS | BIRTH DATE | LIVING TOGETHER OR NOT | ADDRESS (ONLY FOR SEPARATION) | NURTURE OR NOT | LIVELIHOOD |
|---|---|---|---|---|---|---|---|
| 1 | Fuji Minato | child | June 26, 2010 | WITH / NOT | ☑ IN DISTRICT ☐ OUTSIDE DISTRICT | Y / Ⓝ | (SAME) MAINTENANCE |
| 2 | Fuji Mirai | child | December 12, 2013 | WITH / NOT | ☑ IN DISTRICT ☐ OUTSIDE DISTRICT | Y / Ⓝ | (SAME) MAINTENANCE |
| 3 | | | | WITH / NOT | ☐ IN DISTRICT ☐ OUTSIDE DISTRICT | Y / N | SAME MAINTENANCE |
| 4 | | | | WITH / NOT | ☐ IN DISTRICT ☐ OUTSIDE DISTRICT | Y / N | SAME MAINTENANCE |
| 5 | | | | WITH / NOT | ☐ IN DISTRICT ☐ OUTSIDE DISTRICT | Y / N | SAME MAINTENANCE |

① PLEASE, SURELY CHECK ○ TO FIELD OF "LIVING TOGETHER OR NOT" FOR CHILD LIVING TOGETHER.
② IN "NURTURE OR NOT", IF YOU RAISES CHILD, CHECK ○ TO "Y", PLEASE.
③ IN "LIVELIHOOD", IF RECIPIENT IS PARENT, CHECK ○ TO "SAME" AND OTHERWISE, CHECK ○ TO "MAINTENANCE", PLEASE.

| INCOMPLETE DOCUMENT | PENSION | INCOME | NURTURE | IDENTIFICATION CARD | OTHERS |
|---|---|---|---|---|---|

PENSION/OFFICE OR JOB OF RECIPIENT

☐ WELFARE PENSION
☐ MUTUAL PENSION
☐ NATIONAL PENSION
☐ NONE        PHONE NUMBER ( - - )

* FOR CIVIL SERVANT, APPLY TO CIVIL SERVANT OFFICE, PLEASE.
* IN CASE WHERE RECIPIENT SEPARATELY LIVES FROM CHILD OR IS NOT PARENT, ADDITIONAL DOCUMENT IS REQUIRED.
* IF YOU CANNOT SUBMIT DOCUMENT UNTIL DEADLINE, CHILD ALLOWANCE MAY BE TEMPORARILY SUSPENDED.

---

♦ PLEASE, ATTACH COPY OF HEALTH INSURANCE CARD OF RECIPIENT ♦

IN CASE OF PENSION HOLDER OF VARIOUS MUTUAL PENSIONS, ATTACH COPY OF HEALTH INSURANCE CARD OF RECIPIENT, PLEASE.
(NOT COPY OF DRIVER'S LICENSE OR INSURANCE POLICY OF CHILD)

○ IF YOU CANNOT ATTACH COPY OF HEALTH INSURANCE CARD, CERTIFICATE (PRESCRIBED FORM) FOR SUBSCRIPTION SITUATION OF WELFARE PENSION/MUTUAL PENSION IS REQUIRED FROM OFFICE, SO CONTACT US, PLEASE.

○ IN CASE OF NATIONAL PENSION/NONE PENSION, IT IS NOT REQUIRED.

| EMPLOYEE CLASSIFICATION | | APPLICABLE/NON-APPLICABLE/EXCEPTIONAL | |
|---|---|---|---|
| EXAMINATION | INCOME A | | YEN |
| AMOUNT DEDUCTED | MISCELLANEOUS LOSS | | YEN |
| | MEDICAL EXPENSES | | YEN |
| | AMOUNT DEDUCTED FOR SMALL BUSINESS | | YEN |
| | DISABILITY | | YEN |
| | PROFOUND DISABILITY | | YEN |
| | DISABILITY/EXCEPTION/ SENIOR/OTHERS | | YEN |
| | IN TOTAL | | YEN |
| TOTAL AMOUNT DEDUCTED B | | 80,000 YEN | ADDRESS CONFIRMATION YEN |
| A-B | | YEN | INCOME CONFIRMATION |
| NUMBER OF DEPENDENTS (SENIOR REPEATED) | | PERSON | DEPENDENT CONFIRMATION |
| INCOME LIMIT | | | SKIP |

PAYMENT AMOUNT (MONTHLY)

| UNDER 3/THIRD CHILD | 15,000 YEN × | PERSON | YEN |
|---|---|---|---|
| OVER AGE OF 3 | 10,000 YEN × | PERSON | YEN |
| SPECIAL BENEFIT | 5,000 YEN × | PERSON | YEN |
| TOTAL | | | YEN |

| DETERMINATION | HOLDING | EXTINCT | MAINTENANCE |
|---|---|---|---|

*PLEASE, FILL INSIDE ONLY BOLD LINE.

APPLICATION FOR CHILD ALLOWANCE/SPECIAL BENEFIT IN 2015
AS FOLLOWS, I WILL NOTIFY CURRENT STATE.

FOR REVIEW OF RECIPIENT ELIGIBILITY,
I AGREE TO CONFIRM INCOME AMOUNT AND LIKE BY EXISTING OFFICIAL DOCUMENT.

SUBMISSION DATE: 2015 YEAR / 3 MONTH / 15 DAY — CERTIFICATION NUMBER

RECIPIENT

| NAME *SIGNATURE/SEAL | | | | BIRTH DATE | FEBRUARY 20, 1962 | SEX | (MALE)・FEMALE |
|---|---|---|---|---|---|---|---|
| ADDRESS | 6-1 Minatomirai, Nishi-ku, Yokohama-shi, Kanagawa, Japan | | | SPOUSE/NAME | | NAME | Fuji Hanako |
| PHONE NUMBER | 123-456-7890 | CHANGED PHONE NUMBER ⇒ | | | Y・(N) | | |
| ADDRESS ON JANUARY 1, 2015 | ☑ IN DISTRICT | ☐ OUTSIDE DISTRICT | ☐ OVERSEAS | SPOUSE JOB | ☑ NONE ☐ OFFICE WORKER ☐ CIVIL SERVANT ☐ SELF-EMPLOYED ☐ OTHERS | CIVIL SERVANT OFFICE | SELF-EMPLOYED/OTHERS |
| ATTRIBUTE OF RECIPIENT | ☑ PARENT ☐ GUARDIAN OF MINOR ☐ DESIGNATED FROM PARENT ☐ OTHERS | | | | | | |

DEPENDENT CHILDREN UNDER AGE OF 18

| | NAME | DOMESTIC RELATIONS | BIRTH DATE | LIVING TOGETHER OR NOT | ADDRESS (ONLY FOR SEPARATION) | NURTURE OR NOT | LIVELIHOOD |
|---|---|---|---|---|---|---|---|
| 1 | Fuji Minato | child | June 26, 2010 | (WITH) NOT | ☑ IN DISTRICT ☐ OUTSIDE DISTRICT | Y (N) | (SAME) MAINTENANCE |
| 2 | Fuji Mirai | child | December 12, 2013 | (WITH) NOT | ☑ IN DISTRICT ☐ OUTSIDE DISTRICT | Y (N) | (SAME) MAINTENANCE |
| 3 | | | | WITH NOT | ☐ IN DISTRICT ☐ OUTSIDE DISTRICT | Y N | SAME MAINTENANCE |
| 4 | | | | WITH NOT | ☐ IN DISTRICT ☐ OUTSIDE DISTRICT | Y N | SAME MAINTENANCE |
| 5 | | | | WITH NOT | ☐ IN DISTRICT ☐ OUTSIDE DISTRICT | Y N | SAME MAINTENANCE |

◎ PLEASE, SURELY CHECK O TO FIELD OF "LIVING TOGETHER OR NOT" FOR CHILD LIVING TOGETHER.
◎ IN "NURTURE OR NOT", IF YOU RAISES CHILD, CHECK O TO "Y", PLEASE.
◎ IN "LIVELIHOOD", IF RECIPIENT IS PARENT, CHECK O TO "SAME" AND OTHERWISE, CHECK O TO "MAINTENANCE", PLEASE.

| INCOMPLETE DOCUMENT | PENSION | INCOME | NURTURE | IDENTIFICATION CARD | OTHERS |
|---|---|---|---|---|---|

PENSION/OFFICE OR JOB OF RECIPIENT

☐ WELFARE PENSION
☐ MUTUAL PENSION
☐ NATIONAL PENSION
☐ NONE

PHONE NUMBER ( - - )

* FOR CIVIL SERVANT, APPLY TO CIVIL SERVANT OFFICE, PLEASE.
* IN CASE WHERE RECIPIENT SEPARATELY LIVES FROM CHILD OR IS NOT PARENT, ADDITIONAL DOCUMENT IS REQUIRED.
* IF YOU CANNOT SUBMIT DOCUMENT UNTIL DEADLINE, CHILD ALLOWANCE MAY BE TEMPORARILY SUSPENDED.

---

◆ PLEASE, ATTACH COPY OF HEALTH INSURANCE CARD OF RECIPIENT. ◆

IN CASE OF PENSION HOLDER OF VARIOUS MUTUAL PENSIONS, ATTACH COPY OF HEALTH INSURANCE CARD OF RECIPIENT, PLEASE.
(NOT COPY OF DRIVER'S LICENSE OR INSURANCE POLICY OF CHILD)

○ IF YOU CANNOT ATTACH COPY OF HEALTH INSURANCE CARD, CERTIFICATE (PRESCRIBED FORM) FOR SUBSCRIPTION SITUATION OF WELFARE PENSION/MUTUAL PENSION IS REQUIRED FROM OFFICE, SO CONTACT US, PLEASE.

○ IN CASE OF NATIONAL PENSION/NONE PENSION, IT IS NOT REQUIRED.

| EMPLOYEE CLASSIFICATION | | APPLICABLE/NON-APPLICABLE/EXCEPTIONAL |
|---|---|---|
| EXAMINATION | INCOME A | YEN |
| AMOUNT DEDUCTED | MISCELLANEOUS LOSS | YEN |
| | MEDICAL EXPENSES | YEN |
| | AMOUNT DEDUCTED FOR SMALL BUSINESS | YEN |
| | DISABILITY | YEN |
| | PROFOUND DISABILITY | YEN |
| | DISABILITY/EXCEPTION/SENIOR/OTHERS | YEN |
| IN TOTAL | | YEN |

| TOTAL AMOUNT DEDUCTED B | 80,000 YEN | ADDRESS CONFIRMATION | YEN |
|---|---|---|---|
| A-B | | INCOME CONFIRMATION | YEN |
| NUMBER OF DEPENDENTS (SENIOR REPEATED) | PERSON | DEPENDENT CONFIRMATION | SKIP |
| INCOME LIMIT | | | |

PAYMENT AMOUNT (MONTHLY)

| UNDER 3/THIRD CHILD | 15,000 YEN × | PERSON | YEN |
|---|---|---|---|
| OVER AGE OF 3 | 10,000 YEN × | PERSON | YEN |
| SPECIAL BENEFIT | 5,000 YEN × | PERSON | YEN |
| TOTAL | | | YEN |

| DETERMINATION | HOLDING | EXTINCT | MAINTENANCE |
|---|---|---|---|

FIG. 20

INFORMATION PROCESSING APPARATUS AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2018-179372 filed Sep. 25, 2018.

BACKGROUND

(i) Technical Field

The present invention relates to an information processing apparatus and a non-transitory computer readable medium storing a program.

(ii) Related Art

For example, JP-A-2016-212812 discloses a technology for determining, by using a certainty factor which is a value for indicating certainty of a recognition result of a text included in image data obtained by digitizing a document and a predetermined threshold value of the certainty factor, a method of confirming operations which are an operation of confirming or correcting the recognition result of the text included in the image data and an operation of confirming a picture included in the image data.

SUMMARY

Meanwhile, in a case where a plurality of areas having different degrees of necessity of the confirming operation coexist in one document, regardless of the degree of necessity of the confirming operation, screens for performing the confirming operations are displayed in an identical display mode, in some cases. In this case, it becomes difficult for a confirmer who performs a confirming operation to recognize the degree of necessity of the confirming operation. For this reason, in some cases, the confirming operation for an area in which necessity of the confirming operation is relatively high is missed or the confirming operation for an area in which necessity of the confirming operation is relatively low is executed.

Aspects of non-limiting embodiments of the present disclosure relate to an information processing apparatus and a non-transitory computer readable medium storing a program capable of executing a confirming operation in an appropriate display mode for each of areas according to a degree of necessity as compared with a case where screens for performing the confirming operations are displayed in an identical display mode regardless of the degree of necessity of the confirming operation, in a case where a plurality of areas having different degrees of necessity of the confirming operation coexist in one document.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including: an obtaining unit that obtains image data and a recognition result, the image data being data obtained by digitizing a document including a plurality of areas in one document, the recognition result being a result obtained by recognizing the image data; and a control unit that performs control to display an area image corresponding to each of the plurality of areas in the image data obtained by the obtaining unit and an area recognition result corresponding to each of the plurality of areas in the recognition result in accordance with a display mode predetermined according to a degree of necessity of a confirming operation corresponding to each of the plurality of areas.

BRIEF DESCRIPTION OF THE DRAWINGS

Exemplary embodiment(s) of the present invention will be described in detail based on the following figures, wherein:

FIG. 5 is a front view illustrating an example of a form definition screen according to the exemplary embodiment;

FIG. 6 is a front view illustrating another example of the form definition screen according to the exemplary embodiment;

FIG. 7 is a front view illustrating still another example of the form definition screen according to the exemplary embodiment;

FIG. 8 is a diagram illustrating an example of an importance table according to the exemplary embodiment;

FIG. 9 is a flowchart illustrating an example of a flow of a confirmation determining process by a confirmation processing program according to the exemplary embodiment;

FIG. 10 is a front view illustrating an example of a confirmation/correction screen according to the exemplary embodiment;

FIG. 11 is a front view illustrating another example of the confirmation/correction screen according to the exemplary embodiment;

FIG. 12 is a front view illustrating still another example of the confirmation/correction screen according to the exemplary embodiment;

FIG. 13 is a front view illustrating still another example of the confirmation/correction screen according to the exemplary embodiment;

FIG. 14 is a front view illustrating still another example of the confirmation/correction screen according to the exemplary embodiment;

FIG. 15 is a front view illustrating still another example of the confirmation/correction screen according to the exemplary embodiment;

FIG. 16 is a front view illustrating still another example of the confirmation/correction screen according to the exemplary embodiment;

FIG. 17 is a diagram illustrating an example of a completed form according to the exemplary embodiment;

FIG. 18 is a diagram illustrating another example of the completed form according to the exemplary embodiment;

FIG. 19 is a diagram illustrating still another example of the completed form according to the exemplary embodiment;

FIG. 20 is a diagram illustrating still another example of the completed form according to the exemplary embodiment.

DETAILED DESCRIPTION

Hereinafter, exemplary embodiments of the present invention will be described in detail with reference to the accompanying drawings.

Figure 1:
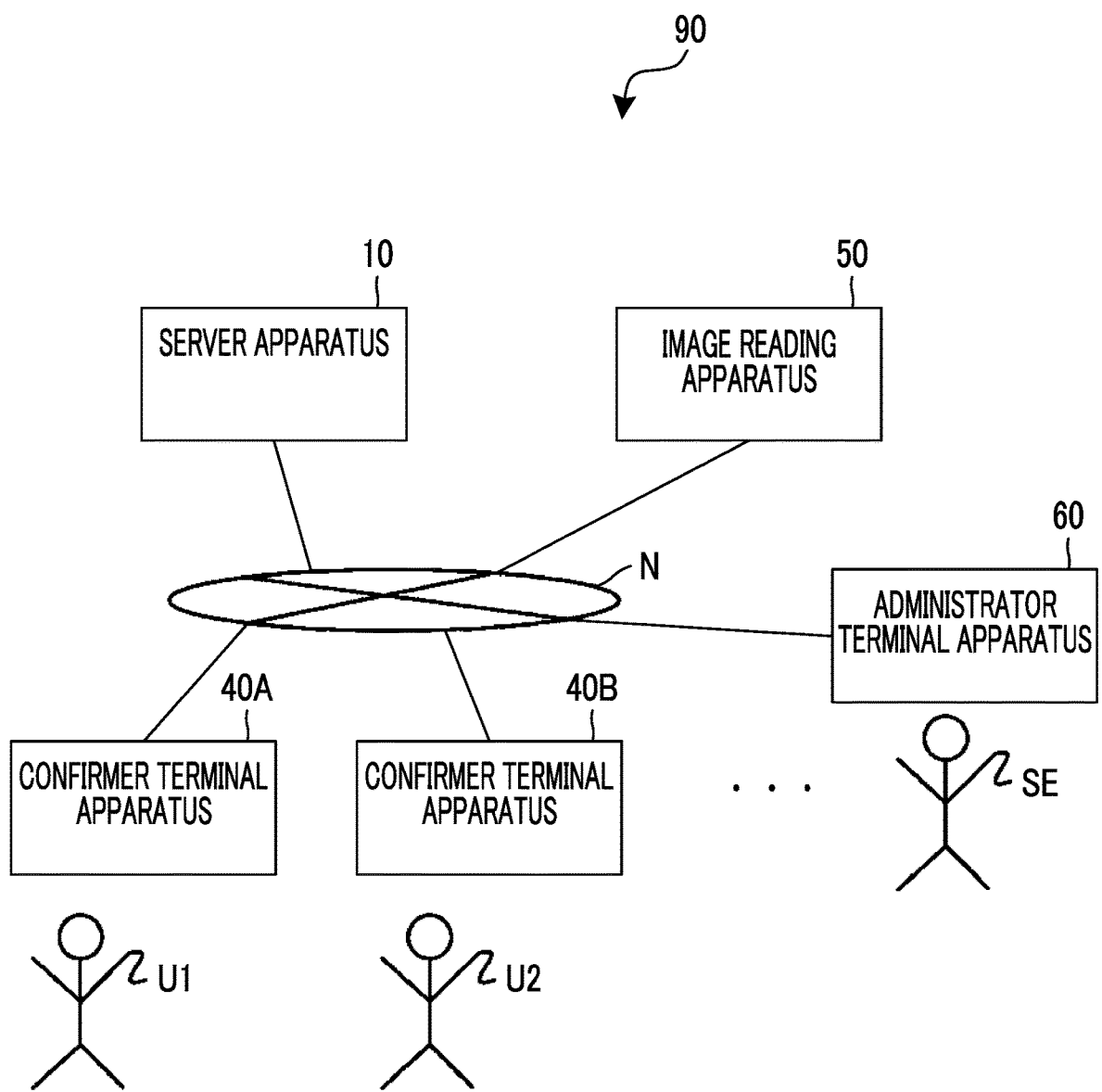
FIG. 1 is a diagram illustrating an example of a configuration of an information processing system according to an exemplary embodiment.

FIG. 1 is a diagram illustrating an example of a configuration of an information processing system 90 according to the present exemplary embodiment.

As illustrated in FIG. 1, the information processing system 90 according to the present exemplary embodiment includes a server apparatus 10, confirmer terminal apparatuses 40A, 40B, . . . , an image reading apparatus 50, and an administrator terminal apparatus 60. The server apparatus 10 is an example of an information processing apparatus.

The server apparatus 10 is communicably connected with each of the confirmer terminal apparatuses 40A, 40B, . . . , the image reading apparatus 50, and the administrator terminal apparatus 60 via a network N. As an example, a general-purpose computer such as a server computer, a personal computer (PC), or the like is applied to the server apparatus 10. In addition, as the network N, for example, the Internet, a local area network (LAN), a wide area network (WAN), or the like is applied.

The image reading apparatus 50 has a function of optically reading a form or the like of a paper medium to obtain image data and transmitting the obtained image data (hereinafter, referred to as "form image") to the server apparatus 10. As the form referred to here, for example, various forms including a plurality of items such as an address field and a name field are used. In the form, a handwritten text, a printed text, and the like are filled in each of the plurality of items. The form is an example of a document and the item is an example of an area. As specifically described below, the server apparatus 10 performs an optical character recognition (OCR) process, which is an example of an optical character recognition process, on the form image received from the image reading apparatus 50 and obtains a recognition result for an image corresponding to each of the plurality of items. An example of the recognition result includes a text string and the like indicating a sequence of one text or more. In addition, the form image includes a text or a picture. The picture referred to here includes all of elements which are not texts to be recognized in the form image, and includes a line, a seal, a logo, a photo, and the like, as examples.

The confirmer terminal apparatus 40A is a terminal apparatus operated by a confirmer (user) U1 who performs a confirming operation and the confirmer terminal apparatus 40B is a terminal apparatus operated by a confirmer U2 who performs a confirming operation. In a case where it is not necessary to distinguishably describe a plurality of confirmer terminal apparatuses 40A, 40B, . . . , the confirmer terminal apparatuses 40A, 40B, . . . are also collectively referred to as a confirmer terminal apparatus 40. In addition, in a case where it is not necessary to distinguishably describe a plurality of confirmers U1, U2, . . . , the confirmers U1, U2, . . . are also collectively referred to as a confirmer U. For example, a general-purpose computer such as a personal computer (PC), a portable terminal apparatus such as a smartphone, a tablet terminal, or the like is applied to the confirmer terminal apparatus 40. In the confirmer terminal apparatus 40, a confirming operation application program (hereinafter, also referred to as "confirming operation app") for the confirmer U to perform a confirming operation is installed, and a user interface (UI) for the confirming operation is generated and displayed. The confirming operation referred to here means an operation of confirming or correcting a recognition result of a text included in a form image, an operation of confirming a picture included in the form image, or the like. Specifically, the operation of confirming the recognition result of the text is an operation of approving the recognition result by the OCR. The operation of correcting the recognition result of the text is an operation of performing an input in a correction input field on a confirmation/correction screen to be described below. The operation of confirming the picture is, for example, an operation of confirming the presence or absence of a seal.

The administrator terminal apparatus 60 is a terminal apparatus operated by a system administrator SE and the system administrator SE inputs confirmation necessity information and the like to be described below to the administrator terminal apparatus 60. For example, a general-purpose computer such as a personal computer (PC), a portable terminal apparatus such as a smartphone, a tablet terminal, or the like is applied to the administrator terminal apparatus 60.

Figure 2:
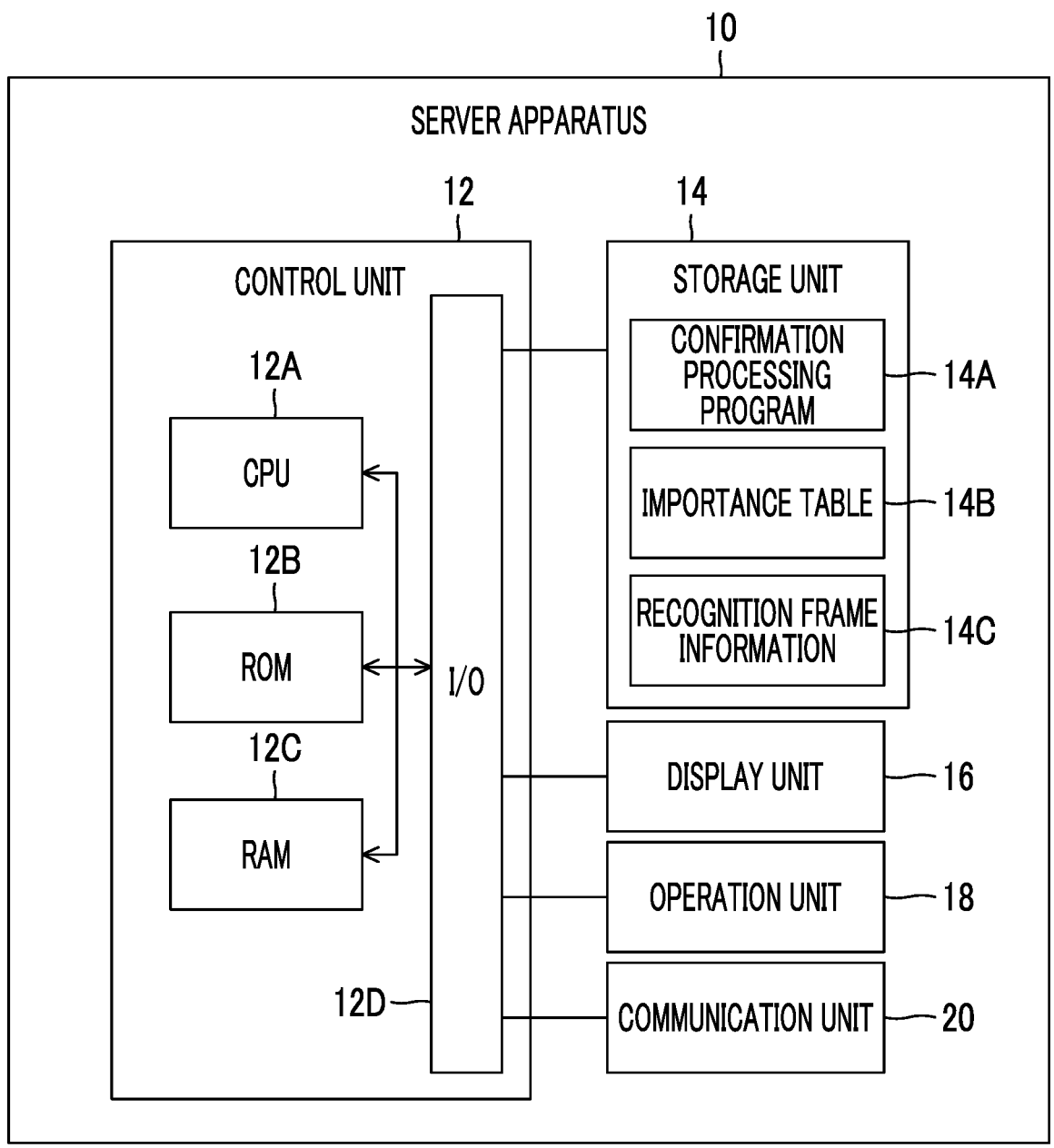
FIG. 2 is a block diagram illustrating an example of an electrical configuration of a server apparatus according to the exemplary embodiment.

FIG. 2 is a block diagram illustrating an example of an electrical configuration of the server apparatus 10 according to the present exemplary embodiment.

As illustrated in FIG. 2, the server apparatus 10 according to the present exemplary embodiment includes a control unit 12, a storage unit 14, a display unit 16, an operation unit 18, and a communication unit 20.

The control unit 12 includes a central processing unit (CPU) 12A, a read only memory (ROM) 12B, a random access memory (RAM) 12C, and an input/output interface (I/O) 12D and these units are connected with one another via a bus.

Each of functional units including the storage unit 14, the display unit 16, the operation unit 18, and the communication unit 20 is connected to the I/O 12D. Each of the functional units enables to mutually communicate with the CPU 12A via the I/O 12D.

The control unit 12 may be configured as a sub-control unit which controls some parts of operations of the server apparatus 10 or may be configured as a part of a main-control unit which controls all of the operations of the server apparatus 10. For example, an integrated circuit (IC) such as a large scale integration (LSI) or an IC chipset is used for a part or all of each of blocks of the control unit 12. An individual circuit may be used for each of the blocks described above, or a circuit of which some or all are integrated may be used for each of the blocks described above. A group of the blocks described above may be provided as one body or some of the blocks may be separately provided. In addition, in each of the blocks described above, a part of the block may be separately provided. For integration of the control unit 12, not only the LSI but also a dedicated circuit or a general-purpose processor may be used.

As the storage unit 14, for example, a hard disk drive (HDD), a solid state drive (SSD), a flash memory, or the like is used. The storage unit 14 stores a confirmation processing program 14A for performing a confirming process according to the present exemplary embodiment. The confirmation processing program 14A may be stored in the ROM 12B. In addition, an importance table 14B and recognition frame information 14C used for the confirming process are stored in the storage unit 14.

The confirmation processing program 14A may be installed in advance in, for example, the server apparatus 10. The confirmation processing program 14A may be realized by appropriately being installed in the server apparatus 10 after being stored in a nonvolatile storage medium or being distributed via the network N. It is assumed that an example of the nonvolatile storage medium is a compact disc read only memory (CD-ROM), a magneto-optical disk, an HDD, a digital versatile disc read only memory (DVD-ROM), a flash memory, a memory card, or the like.

For example, a liquid crystal display (LCD), an organic electro luminescence (EL) display, or the like is used as the display unit 16. The display unit 16 may integrally include a touch panel. The operation unit 18 is provided with a device for an operation input such as a keyboard, a mouse, or the like, for example. The display unit 16 and the operation unit 18 receive various instructions from the user of the server apparatus 10. The display unit 16 displays various types of information such as a result of a process executed according to the instruction received from the user, a notification on the process, and the like.

The communication unit 20 is connected to the network N such as the Internet, a LAN, a WAN, or the like, and enables to communicate with the image reading apparatus 50, the confirmer terminal apparatus 40, and the administrator terminal apparatus 60 via the network N.

Meanwhile, as described above, in a case where the plurality of items having different degrees of necessity of the confirming operation coexist in one form, it is desired that the confirming operation can be executed in an appropriate display mode according to the degree of necessity for each of the items.

Figure 3:
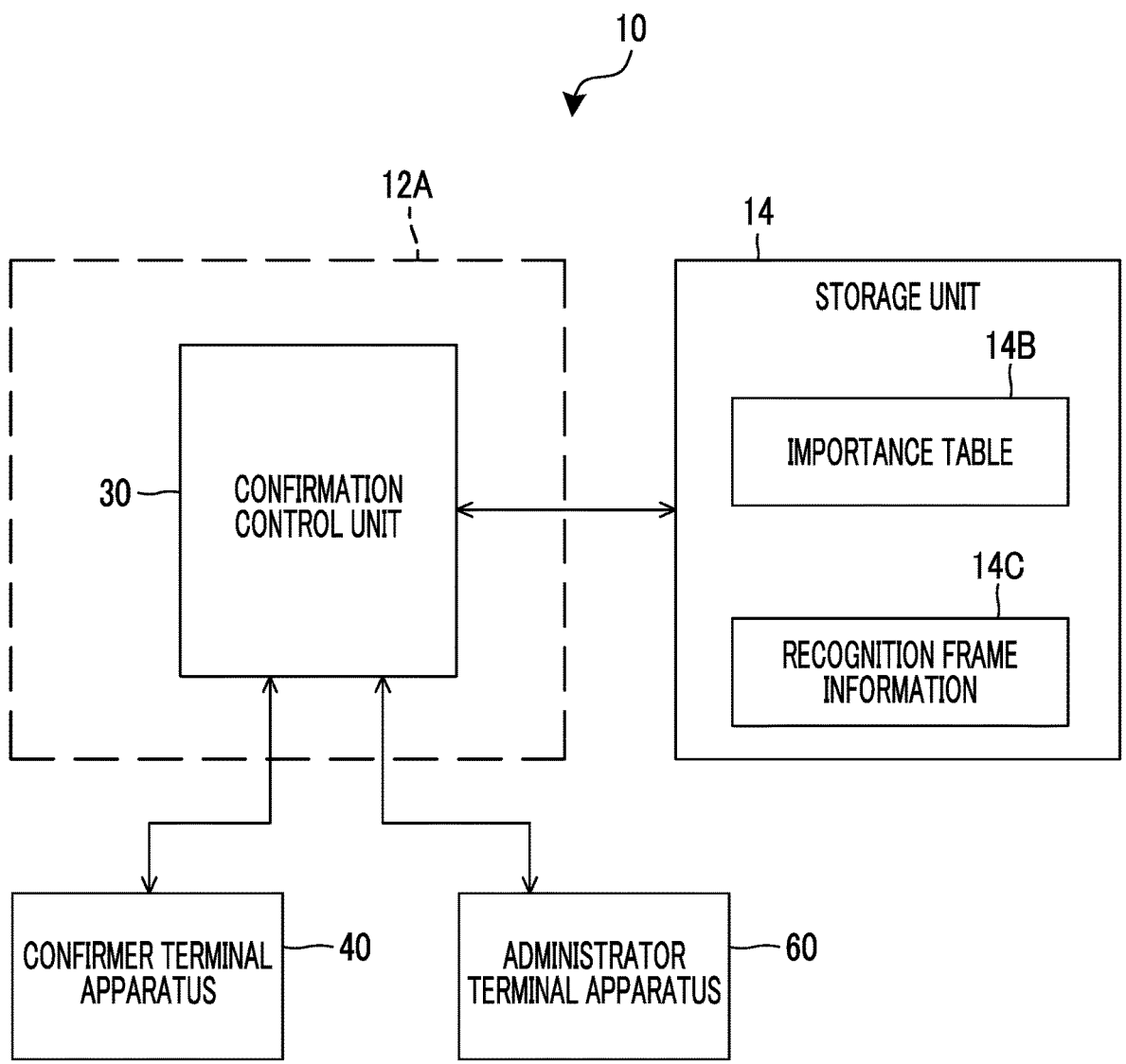
FIG. 3 is a block diagram illustrating an example of a functional configuration of the server apparatus according to the exemplary embodiment.

For this reason, the CPU 12A of the server apparatus 10 according to the present exemplary embodiment functions as a confirmation control unit 30 illustrated in FIG. 3 by writing the confirmation processing program 14A stored in the storage unit 14 in the RAM 12C and executing the confirmation processing program 14A.

FIG. 3 is a block diagram illustrating an example of a functional configuration of the server apparatus 10 according to the present exemplary embodiment.

As illustrated in FIG. 3, the CPU 12A of the server apparatus 10 according to the present exemplary embodiment functions as the confirmation control unit 30. The confirmation control unit 30 is an example of each of an obtaining unit and a control unit. In addition, in the present exemplary embodiment, a case where a form is applied as an example of a document and an item of the form is further applied as an example of an area of the document will be described.

The confirmation control unit 30 according to the present exemplary embodiment obtains a form image which is data obtained by digitizing a form including a plurality of items in one form. The confirmation control unit 30 performs control so as to display an item image corresponding to each of the plurality of items of the obtained form image and an item recognition result corresponding to each of the plurality of items in a recognition result in accordance with a display mode predetermined according to a degree of necessity of a confirming operation corresponding to each of the plurality of items. The item image is an example of an area image and the item recognition result is an example of an area recognition result. The confirmation control unit 30 obtains a certainty factor indicating certainty of the item recognition result and confirmation necessity information indicating whether a confirming operation for the item recognition result is necessary or unnecessary. In this case, the degree of necessity described above is represented by using at least one of the certainty factor or the confirmation necessity information. The confirmation necessity information is, for example, information included in the recognition frame information 14C and is obtained from the recognition frame information 14C. In addition, the item recognition result includes a text string and the like obtained by performing the OCR process on the item image.

Figure 11:
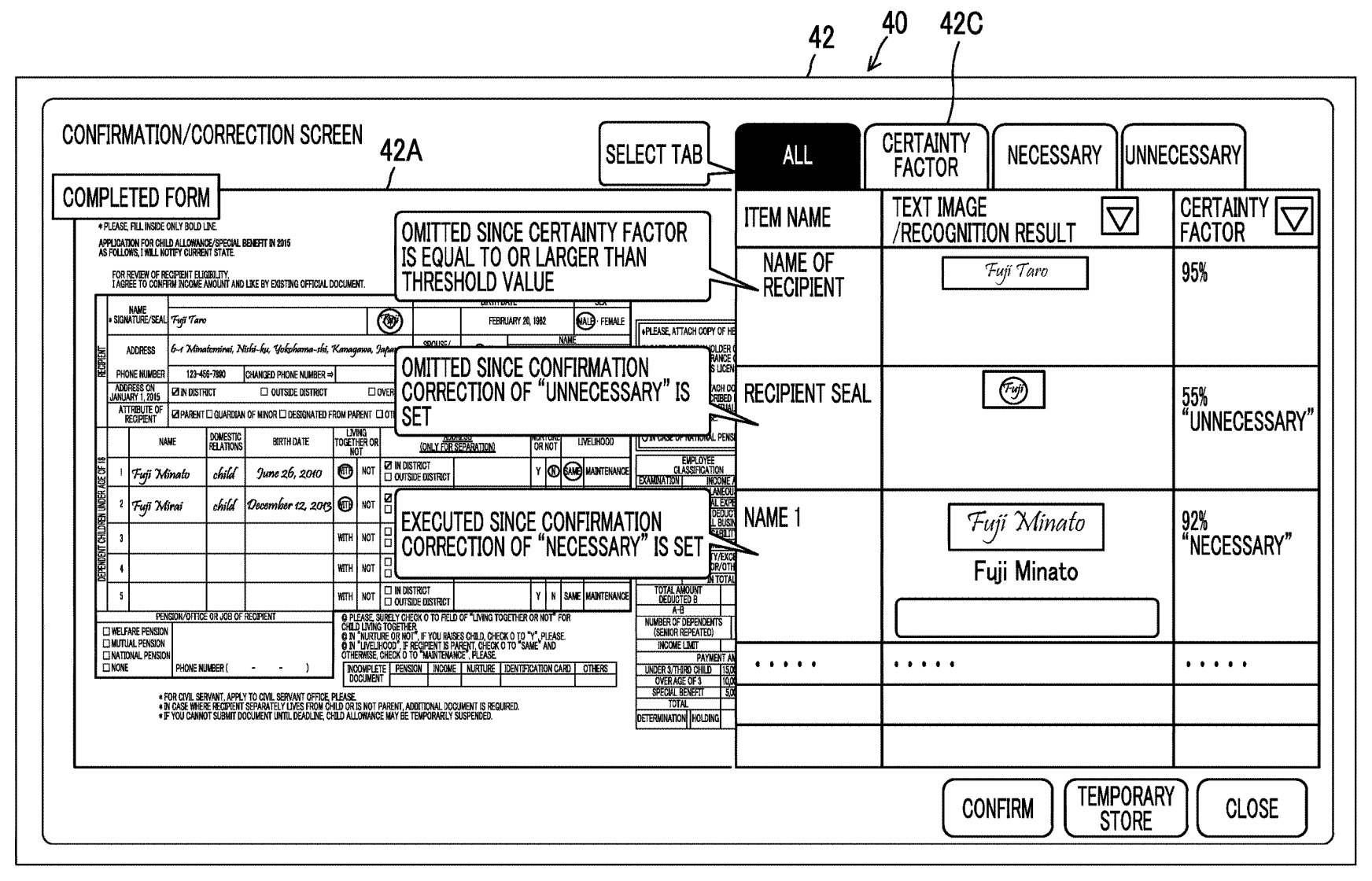
Figure 12:
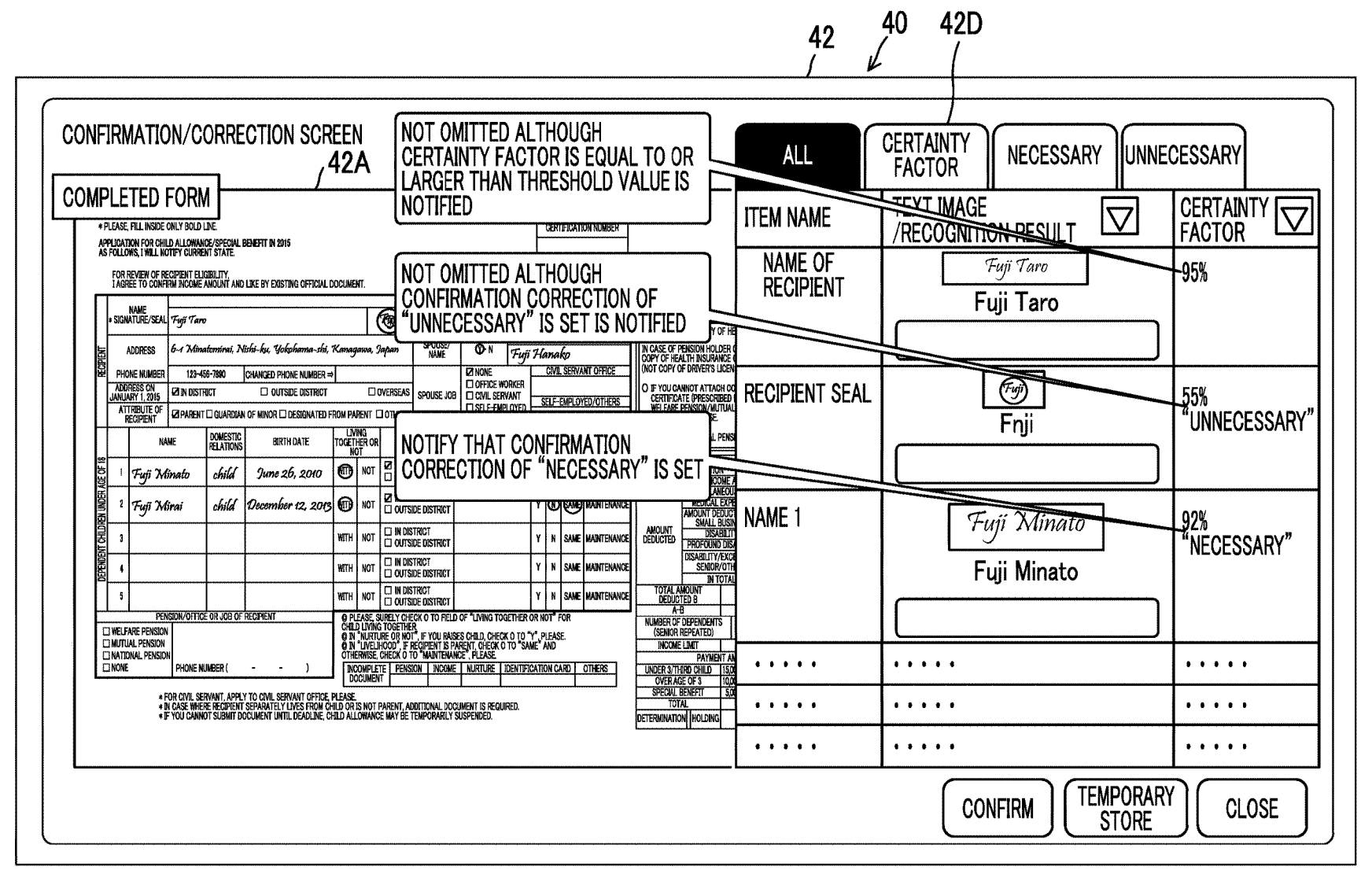

For example, the confirmation control unit 30 performs control so as to classify the items for which necessity of the confirming operation is determined according to the degree of necessity and collectively display all of the items for which necessity of the confirming operation is determined, as illustrated in FIGS. 10 to 12 to be described below, as an example. In this case, the confirmation control unit 30 may perform the control so as to classify the items for which necessity of the confirming operation is determined for types of a method of the confirming operation determined according to the degree of necessity and display the items, as illustrated in FIGS. 13 to 16 to be described below, as an example. For the classification referred to here, for example, a tab to be described below is used.

Specifically, the confirmation control unit 30 performs control to display a correction input field of the item recognition result in addition to the item image and the item recognition result, for only the item for which a degree of necessity is determined to be equal to or larger than a certain value according to the certainty factor or the confirmation necessity information. In a case where the certainty factor is smaller than a threshold value, it is determined that the degree of necessity is equal to or larger than the certain value and in a case where the certainty factor is equal to or larger than the threshold value, it is determined that the degree of necessity is smaller than the certain value. In addition, in a case where confirmation is necessary according to the confirmation necessity information, it is determined that the degree of necessity is equal to or larger than the certain value and in a case where the confirmation is not necessary according to the confirmation necessity information, it is determined that the degree of necessity is smaller than the certain value. That is, for the item for which the confirming operation is determined to be necessary according to the confirmation necessity information described above, the confirmation control unit 30 performs the control to display the item image, the item recognition result, and the correction input field of the item recognition result. In this case, the control may be performed so that the items for which the confirming operation is determined to be necessary are classified by tabs and the item image for each of the items, the item recognition result, and the correction input field of the item recognition result are be displayed corresponding to the tab.

In addition, the confirmation control unit 30 performs control not to display the item image and the item recognition result, for the item for which the degree of necessity is determined to be smaller than the certain value according to the certainty factor or the confirmation necessity information. Further, for the item for which the confirming operation is determined to be unnecessary according to the confirmation necessity information described above, the confirmation control unit 30 may perform the control to display the item image and the item recognition result. In this case, the control may be performed so that the items for which the confirming operation is determined to be unnecessary are classified by tabs and the item image for each of the items and the item recognition result are displayed corresponding to the tab.

In addition, in a case where necessity of the confirming operation is not set by the confirmation necessity information described above, the confirmation control unit 30 performs control to determine the necessity of the confirming operation by using the certainty factor, and display the item image for the item for which the confirming operation is determined to be unnecessary and display the item image, the item recognition result, and the correction input field for the item for which the confirming operation is determined to be necessary. In a case where the necessity of the confirming operation is not set, control may be performed to classify the item for which necessity of the confirming operation is determined by using the certainty factor by the tab, and display the item image corresponding to the tab for each of the items for which the confirming operation is determined to be unnecessary and display the item image, the item recognition result, and the correction input field for each of the items for which the confirming operation is determined to be necessary.

Next, a specific configuration of the server apparatus 10 according to the present exemplary embodiment will be described with reference to FIG. 4.

Figure 4:
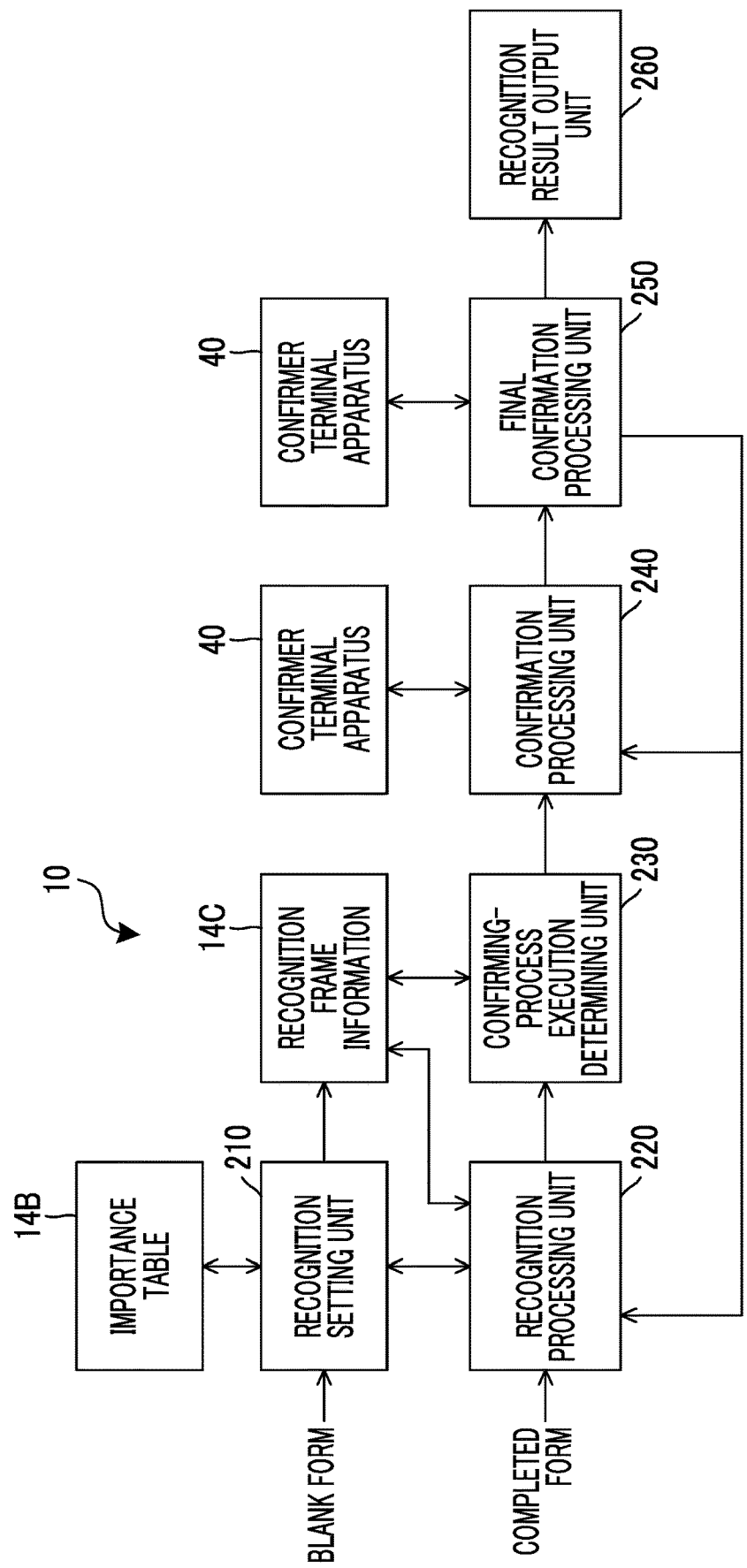
FIG. 4 is a block diagram illustrating an example of a specific configuration of the server apparatus according to the exemplary embodiment.

FIG. 4 is a block diagram illustrating an example of a specific configuration of the server apparatus 10 according to the present exemplary embodiment.

As illustrated in FIG. 4, the server apparatus 10 according to the present exemplary embodiment includes a recognition setting unit 210, a recognition processing unit 220, a confirming-process execution determining unit 230, a confirmation processing unit 240, a final confirmation processing unit 250, and a recognition result output unit 260. Each of the units specifically illustrates the confirmation control unit 30 illustrated in FIG. 3.

The recognition setting unit 210 according to the present exemplary embodiment performs recognition setting for a form image of a blank form as an input. The recognition setting unit 210 sets confirmation necessity information by causing the administrator terminal apparatus 60 to display, for example, a form definition screen 62 illustrated in FIG. 5.

FIG. 5 is a front view illustrating an example of the form definition screen 62 according to the present exemplary embodiment.

The form definition screen 62 illustrated in FIG. 5 is displayed on the administrator terminal apparatus 60 and is a screen for receiving confirmation necessity information input by the system administrator SE. The form definition screen 62 illustrated in FIG. 5 is an example of an input screen.

The form definition screen 62 illustrated in FIG. 5 includes a preview image 62A of a blank form and recognition frame information 62B. The recognition frame information 62B includes a frame type, a frame name, frame coordinates, a text type, a threshold value of a certainty factor, and confirmation correction as an example and is stored in the storage unit 14 as some pieces of the recognition frame information 14C. In the example illustrated in FIG. 5, the recognition frame information 62B related to "recipient seal" is displayed. The confirmation correction of "recipient seal" is an item for setting necessity of confirmation correction, and a setting content in a selected state (in the example illustrated in FIG. 5, "unnecessary" is selected among "unnecessary", "necessary", and "no setting") is highlighted. In addition, these setting contents are selectably displayed in a drop-down list and the selected setting contents are input as confirmation necessity information.

FIG. 6 is a front view illustrating another example of the form definition screen 62 according to the present exemplary embodiment.

In the same manner as FIG. 5 described above, the form definition screen 62 illustrated in FIG. 6 is displayed on the administrator terminal apparatus 60 and is a screen for receiving confirmation necessity information input by the system administrator SE.

The form definition screen 62 illustrated in FIG. 6 includes the preview image 62A of the blank form and recognition frame information 62C. The recognition frame information 62C includes, for example, a frame type, a frame name, frame coordinates, a text type, a threshold value of a certainty factor, and confirmation correction and is stored in the storage unit 14 as some pieces of the recognition frame information 14C. In the example illustrated in FIG. 6, the recognition frame information 62C related to "names of dependent children under the age of 18" is displayed. In the confirmation correction of "names of dependent children under the age of 18", a setting content in a selected state (in the example illustrated in FIG. 6, "necessary" is selected among "unnecessary", "necessary", and "no setting") is highlighted. In addition, these setting contents are selectably displayed in a drop-down list and the selected setting contents are input as confirmation necessity information.

FIG. 7 is a front view illustrating still another example of the form definition screen 62 according to the present exemplary embodiment.

In the same manner as FIGS. 5 and 6 described above, the form definition screen 62 illustrated in FIG. 7 is displayed on the administrator terminal apparatus 60 and is a screen for receiving confirmation necessity information input by the system administrator SE.

The form definition screen 62 illustrated in FIG. 7 includes the preview image 62A of the blank form and recognition frame information 62D. The recognition frame information 62D includes a frame type, a frame name, frame coordinates, a text type, a threshold value of a certainty factor, and confirmation correction as an example and is stored in the storage unit 14 as some pieces of the recognition frame information 14C. In the example illustrated in FIG. 7, the recognition frame information 62D related to "recipient name" is displayed. In the confirmation correction of "recipient name", a setting content in a selected state (in the example illustrated in FIG. 7, "no setting" is selected among "unnecessary", "necessary", and "no setting") is highlighted. In addition, these setting contents are selectably displayed in a drop-down list and the selected setting contents are input as confirmation necessity information. In a case where "no setting" is selected, necessity of the confirmation correction is determined by using a certainty factor.

That is, as some pieces of the recognition frame information 14C, the recognition setting unit 210 performs control so that the administrator terminal apparatus 60 displays the form definition screen 62 which is an example of an input screen for selectively receiving necessity of the confirming operation for an item. As an example, the recognition setting unit 210 stores the confirmation necessity information of which the input is received via the form definition screen 62 in the storage unit 14 as some pieces of the recognition frame information 14C.

Next, the recognition processing unit 220 according to the present exemplary embodiment receives an item image as an input of a form image of a completed form and outputs an item recognition result of the item image and a certainty factor of the item recognition result. Based on the setting contents by the recognition setting unit 210, the recognition processing unit 220 performs the OCR process on the received item image and obtains an item recognition result such as a text string and the like. As a recognition method for the text string and the like, a recognition result of the text string and the like and a known technique for outputting a certainty factor of the recognition result may be used. As described above, the certainty factor is an indicator indicating certainty of the text string and the like, and as a value of the certainty factor increases, a probability that the item image and the text string or the like of the item image coincide with each other increases. As a method of resolving the certainty factor, for example, a known technique described in JP-A-2016-212812 may be used. Among these methods, there is a method using the certainty factor for each of texts, but as a method for converting the certainty factor of each of the texts into a certainty factor of the text string, an appropriate method may be selected from various methods described below.

Set a maximum value of certainty factors for respective texts in a text string as a certainty factor of the text string.

Set a minimum value of certainty factors for respective texts in a text string as a certainty factor of the text string.

Set an average value (a mode value, a median value, or the like) of certainty factors for respective texts in a text string as a certainty factor of the text string.

The confirming-process execution determining unit 230 determines whether or not to perform the confirming operation for the item recognition result by using confirmation necessity information included in the recognition frame information 14C, for the item recognition result and a certainty factor of the item recognition result output from the recognition processing unit 220. That is, in a case where an item corresponding to an item recognition result is set as an item for which a confirming operation is unnecessary, the confirming-process execution determining unit 230 determines that the confirming operation for the item recognition result is unnecessary regardless of a certainty factor of the item recognition result. In addition, in a case where the item corresponding to the item recognition result is set as an item for which a confirming operation is necessary, the confirming-process execution determining unit 230 determines that the confirming operation for the item recognition result is necessary regardless of the certainty factor of the item recognition result. In addition, in a case where the item corresponding to the item recognition result is not set as an item for which a confirming operation is necessary or unnecessary, the confirming-process execution determining unit 230 determines whether the confirming operation for the item recognition result is necessary or unnecessary based on the certainty factor of the item recognition result. In this case, in a case where the certainty factor is smaller than a threshold value, the confirming-process execution determining unit 230 determines that the confirming operation for the item recognition result is necessary as the item recognition result is regarded as negative. In a case where the certainty factor is equal to or larger than the threshold value, the confirming-process execution determining unit 230 determines that the confirming operation for the item recognition result is unnecessary as the item recognition result is regarded as positive. The threshold value used for the determination is obtained from the recognition frame information 14C. The confirming-process execution determining unit 230 outputs a result of the determination to the confirmation processing unit 240.

As described above, the case where necessity of the confirming operation is determined by using the confirmation necessity information included in the recognition frame information 14C is described, but here, the necessity of the confirming operation may be determined based on a degree of importance of the confirming operation for the item.

FIG. 8 is a diagram illustrating an example of the importance table 14B according to the present exemplary embodiment.

In the importance table 14B illustrated in FIG. 8, a degree of importance predetermined by the user such as the system administrator SE or the like is registered in association with each of the plurality of items. The degree of importance is used instead of the confirmation necessity information described above. The degree of importance referred to here is a value determined for each of the items according to magnitude of a risk occurring by not confirming the recognition result.

In this case, the confirming-process execution determining unit 230 reads the degree of importance for the item from the importance table 14B and in a case where the read importance is equal to or larger than a threshold value, the confirming-process execution determining unit 230 determines that the confirming operation for the item recognition result is necessary. On the other hand, in a case where the degree of importance is smaller than the threshold value, the confirming-process execution determining unit 230 determines that the confirming operation for the item recognition result is unnecessary. As the item having the larger risk occurring by not confirming the item recognition result, the degree of importance is registered as a larger value. For example, in a case of the example illustrated in FIG. 8, "name", "address", and "certification number" are included. Meanwhile, in a case where "certification number" is incorrectly recognized, there is a possibility that a large number of steps for correction is required and a great loss is caused. For this reason, the degree of importance is increased ("30" in the example illustrated in FIG. 8). On the other hand, since "address" is referred to only in a case of some inquiry, even in a case where "address" is incorrectly recognized, it is conceivable that the occurring risk is small. For this reason, the degree of importance is decreased ("10" in the example illustrated in FIG. 8).

Based on the determination result received from the confirming-process execution determining unit 230, the confirmation processing unit 240 according to the present exemplary embodiment feeds the item image and the item recognition result back to the confirmer U for the item for which the confirming operation is necessary and causes the confirmer U to perform the confirming operation. Specifically, in a case where the confirming operation for the item recognition result is determined to be performed, the confirmation processing unit 240 causes the confirmer terminal apparatus 40 to display a confirmation screen for performing the confirming operation and on the confirmation screen, the item to be confirmed of the form is emphasized and displayed. The emphasis referred to here includes, as an example, changing a color of an image of the item, giving a background color to the image of the item, further attaching a decoration such as an underline or a borderline to the image of the item, or the like. A specific example of the confirmation screen will be described below. The confirmation processing unit 240 outputs the item image, the item recognition result, and a confirmation result by the confirmer U to the final confirmation processing unit 250.

Based on the item image and the item recognition result received from the confirmation processing unit 240 and the confirmation result by the confirmer U, the final confirmation processing unit 250 according to the present exemplary embodiment causes a confirmer U different from the confirmer U to perform a final confirming operation. Specifically, the final confirmation processing unit 250 causes the confirmer terminal apparatus 40 used by the other confirmer U to display a confirmation screen for performing the final confirming operation and obtains a final confirmation result from the other confirmer U. Based on the final confirmation result from the other confirmer U, in a case where there is an error in the confirmation result of the confirmer U, the final confirmation processing unit 250 returns the confirmation result to the confirmation processing unit 240 and in a case where there are omissions in the input completed form (for example, page shortage or the like), the final confirmation processing unit 250 returns the confirmation result to the recognition processing unit 220. The final confirmation processing unit 250 outputs the final recognition result to the recognition result output unit 260.

The recognition result output unit 260 according to the present exemplary embodiment outputs the final recognition result received from the final confirmation processing unit 250. An output destination of the final recognition result is not particularly limited, but at least one of the display unit 16, the confirmer terminal apparatus 40, or the administrator terminal apparatus 60 may be set as the output destination.

Next, an action of the server apparatus 10 according to the present exemplary embodiment will be described with reference to FIG. 9.

FIG. 9 is a flowchart illustrating an example of a flow of a confirmation determining process by the confirmation processing program 14A according to the present exemplary embodiment.

First, in a case where the server apparatus 10 receives an instruction of starting the confirmation determining process for a completed form, the confirmation processing program 14A is activated and executes each of the following steps.

In step 100 in FIG. 9, the recognition processing unit 220 receives an input of the completed form.

In step 102, the recognition processing unit 220 recognizes a text by performing the OCR process on an image for each of items in the completed form and obtains a recognition result for each of the items and a certainty factor of the recognition result.

In step 104, the confirming-process execution determining unit 230 specifies an item according to a predetermined order, as an example.

In step 106, the confirming-process execution determining unit 230 obtains the recognition frame information 14C for the item specified in step 104.

In step 108, the confirming-process execution determining unit 230 refers to "confirmation correction" of the recognition frame information 14C obtained in step 106.

In step 110, the confirming-process execution determining unit 230 determines setting contents set to "confirmation correction" referred to in step 108. In a case where "necessary" is set to "confirmation correction" (a case of "necessary"), the process moves to step 112, in a case where "unnecessary" is set to "confirmation correction" (a case of "unnecessary"), the process moves to step 114, and in a case where "no setting" is set to "confirmation correction" (a case of "no"), the process moves to step 116.

In step 112, the confirming-process execution determining unit 230 determines that a confirming operation for a recognition result of an image corresponding to the item described above is necessary and outputs the determination result to the confirmation processing unit 240.

On the other hand, in step 114, the confirming-process execution determining unit 230 determines that the confirming operation for the recognition result of the image corresponding to the item described above is unnecessary and outputs the determination result to the confirmation processing unit 240.

On the other hand, in step 116, the confirming-process execution determining unit 230 determines necessity of the confirming operation for the recognition result of the image corresponding to the item described above by using the certainty factor and outputs the determination result to the confirmation processing unit 240. In this case, in a case where a certainty factor is smaller than a threshold value, the confirming-process execution determining unit 230 determines that the confirming operation for the recognition result is necessary as the recognition result is regarded as negative. In a case where the certainty factor is equal to or larger than the threshold value, the confirming-process execution determining unit 230 determines that the confirming operation for the recognition result is unnecessary as the recognition result is regarded as positive.

In step 118, the confirming-process execution determining unit 230 determines whether or not the item is a final item. In a case where it is determined that the item is the final item (a case of positive determination), the confirmation determining process by the confirmation processing program 14A is terminated and in a case where it is determined that the item is not the final item (a case of negative determination), the process returns to step 104 and the process is repeated.

Next, a confirming operation by the confirmer U will be described with reference to FIGS. 10 to 16.

FIG. 10 is a front view illustrating an example of a confirmation/correction screen 42 according to the present exemplary embodiment.

The confirmation/correction screen 42 illustrated in FIG. 10 is displayed on the confirmer terminal apparatus 40 and is a screen for the confirmer U performing a confirming operation of a recognition result. The confirmation/correction screen 42 illustrated in FIG. 10 is an example of a confirmation screen and is displayed by the confirmation processing unit 240 described above.

The confirmation/correction screen 42 illustrated in FIG. 10 includes a preview image 42A of a completed form and a determination result list 42B. The determination result list 42B displays an item for which a confirming operation is determined to be necessary, an item for which the confirming operation is determined to be unnecessary, and an item for which necessity of the confirming operation is determined by using a certainty factor, for the completed form represented as the preview image 42A, as a list.

In the example illustrated in FIG. 10, as an example of the item, "recipient name", "recipient seal", and "name 1 of a dependent child under the age of 18" are displayed. In "recipient name", since "no" is set to "confirmation correction" and a certainty factor is equal to or larger than a threshold value, the confirming operation is omitted. For this reason, only a corresponding item image "Fuji Taro" in the example illustrated in FIG. 10) is displayed. In "recipient seal", since "unnecessary" is set to "confirmation correction", the confirming operation is omitted. For this reason, only a corresponding item image "Fuji" in the example illustrated in FIG. 10) is displayed. In "name 1 of a dependent child under the age of 18", since "necessary" is set to "confirmation correction", the confirming operation is executed. For this reason, a corresponding item image ("Fuji Minato" in the example illustrated in FIG. 10), an item recognition result ("Fuji Minato" in the example illustrated in FIG. 10) by the OCR process, and a correction input field of the item recognition result are displayed. As illustrated in FIG. 10, the correction input field is displayed as a rectangular frame, as an example. In addition, since "name 1 of a dependent child under the age of 18" is a target of the confirming operation, "name 1 of a dependent child under the age of 18" is emphasized and displayed by changing a color of the item.

FIG. 11 is a front view illustrating another example of the confirmation/correction screen 42 according to the present exemplary embodiment.

In the same manner as the example illustrated in FIG. 10, the confirmation/correction screen 42 illustrated in FIG. 11 is displayed on the confirmer terminal apparatus 40 and is a screen for the confirmer U performing a confirming operation of a recognition result.

The confirmation/correction screen 42 illustrated in FIG. 11 includes the preview image 42A of the completed form and a determination result list 42C. The determination result list 42C displays a list of an item for which a confirming operation is determined to be necessary, a list of an item for which the confirming operation is determined to be unnecessary, and a list of an item for which necessity of the confirming operation is determined by using a certainty factor, for the completed form represented as the preview image 42A to be selectable by a tab. Here, as examples of selectable tabs, "all", "certainty factor", "necessary", and "unnecessary" are displayed.

In the example illustrated in FIG. 11, a case where a tab of "all" is selected is described. In this case, the same list as the determination result list 42B illustrated in FIG. 10 is displayed.

FIG. 12 is a front view illustrating still another example of the confirmation/correction screen 42 according to the present exemplary embodiment.

In the same manner as the example illustrated in FIG. 10, the confirmation/correction screen 42 illustrated in FIG. 12 is displayed on the confirmer terminal apparatus 40 and is a screen for the confirmer U performing a confirming operation of a recognition result.

The confirmation/correction screen 42 illustrated in FIG. 12 includes the preview image 42A of the completed form and a determination result list 42D. In the same manner as the example illustrated in FIG. 11, in the determination result list 42D, as examples of selectable tabs, "all", "certainty factor", "necessary", and "unnecessary" are displayed.

In the example illustrated in FIG. 12, a case where a tab of "all" is selected is described. Unlike the example illustrated in FIG. 11, a screen in a case where the confirming operation is performed for all of items is illustrated.

That is, in the same manner as the example illustrated in FIG. 11, in the example illustrated in FIG. 12, as items, "recipient name", "recipient seal", and "name 1 of a dependent child under the age of 18" are displayed. In "recipient name", "no" is set to "confirmation correction" and a certainty factor is equal to or larger than a threshold value, but only by notifying that the certainty factor is equal to or larger than the threshold value, the confirming operation is not omitted. For this reason, a corresponding item image "Fuji Taro" in the example illustrated in FIG. 12), an item recognition result "Fuji Taro" in the example illustrated in FIG. 12) by the OCR process, and a correction input field of the item recognition result are displayed. In "recipient seal", "unnecessary" is set to "confirmation correction", but only by notifying that the confirmation correction is set to be unnecessary, the confirming operation is not omitted. For this reason, in the same manner described above, a corresponding item image "Fuji" in the example illustrated in FIG. 12), an item recognition result "Fnji" in the example illustrated in FIG. 12) by the OCR process, and a correction input field of the item recognition result are displayed. In "name 1 of a dependent child under the age of 18", since "necessary" is set to "confirmation correction", it is notified that the confirmation correction is necessary and the confirming operation is executed. For this reason, a corresponding item image ("Fuji Minato" in the example illustrated in FIG. 12), an item recognition result ("Fuji Minato" in the example illustrated in FIG. 12) by the OCR process, and a correction input field of the item recognition result are displayed.

Here, the confirmation processing unit 240 according to the present exemplary embodiment may arrange the items for which necessity of the confirming operation is determined, in order in which the confirming operation is required according to the degree of necessity described above. The order in which the confirming operation is required here is any one of ascending order of certainty factors for the respective items and descending order of importance (see FIG. 8) for the respective items. Alternatively, as the order in which the confirming operation is required, the confirmation processing unit 240 may display the item for which the confirming operation is determined to be necessary before the item for which the confirming operation is determined to be unnecessary.

Figure 13:
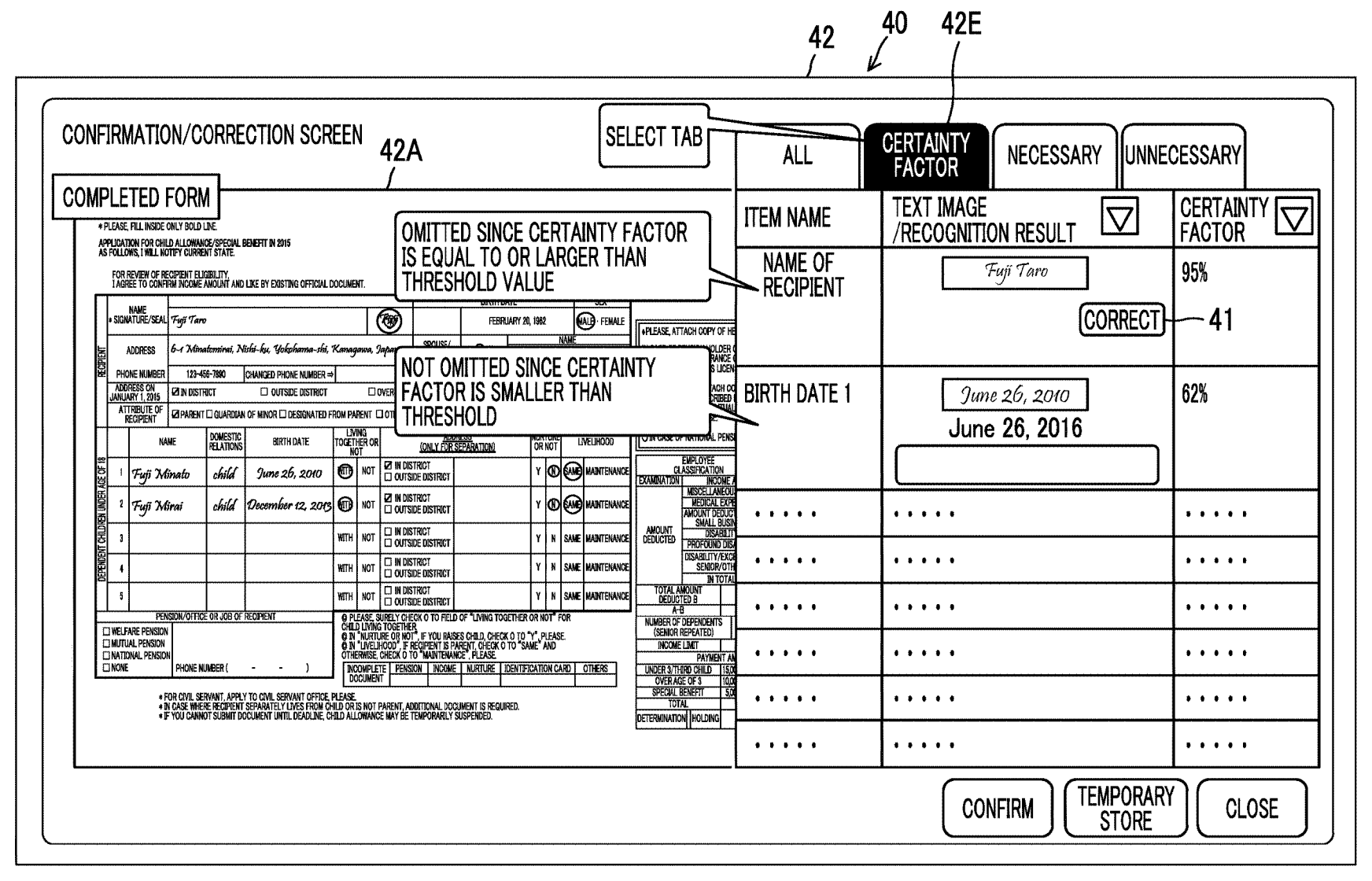

FIG. 13 is a front view illustrating still another example of the confirmation/correction screen 42 according to the present exemplary embodiment.

In the same manner as the example illustrated in FIG. 10, the confirmation/correction screen 42 illustrated in FIG. 13 is displayed on the confirmer terminal apparatus 40 and is a screen for the confirmer U performing a confirming operation of a recognition result.

The confirmation/correction screen 42 illustrated in FIG. 13 includes the preview image 42A of the completed form and a determination result list 42E. In the same manner as the example illustrated in FIG. 11, in the determination result list 42E, as examples of selectable tabs, "all", "certainty factor", "necessary", and "unnecessary" are displayed.

In the example illustrated in FIG. 13, a screen in a case where a tab of "certainty factor" is selected is illustrated and as items, "recipient name" and "birth date 1 of a dependent child under the age of 18" are displayed. In "recipient name", since "no" is set to "confirmation correction" and a certainty factor is equal to or larger than a threshold value, the confirming operation is omitted. For this reason, only a corresponding item image "Fuji Taro" in the example illustrated in FIG. 13) is displayed. In "birth date 1 of a dependent child under the age of 18", since "no" is set to "confirmation correction" and the certainty factor is smaller than the threshold value, the confirming operation is executed. For this reason, a corresponding item image ("Jun. 26, 2010" in the example illustrated in FIG. 13), an item recognition result ("Jun. 26, 2016" in the example illustrated in FIG. 13) by the OCR process, and a correction input field of the item recognition result are displayed.

Here, the confirmation processing unit 240 according to the present exemplary embodiment may perform control to display a correction button 41 for the item for which the confirming operation is determined to be unnecessary ("recipient name" in the example illustrated in FIG. 13) according to the certainty factor, as an example, as illustrated in FIG. 13. The correction button 41 is a button for displaying the item recognition result by the OCR process and the correction input field of the item recognition result. By the confirmer U selectively operating the correction button 41, as illustrated in FIG. 12 described above, the item recognition result "Fuji Taro" in the example illustrated in FIG. 12) by the OCR process and the correction input field of the item recognition result are displayed. The correction button 41 is not limited to the case of displaying the tab, and is applied to a case of displaying the list illustrated in FIG. 10 described above.

In addition, the confirmation processing unit 240 may arrange the items for which necessity of the confirming operation is determined according to the certainty factor, for each of classified and displayed types of the method of the confirming operation. Here, examples of the types of the method of the confirming operation are "certainty factor", "necessary", and "unnecessary".

Figure 14:
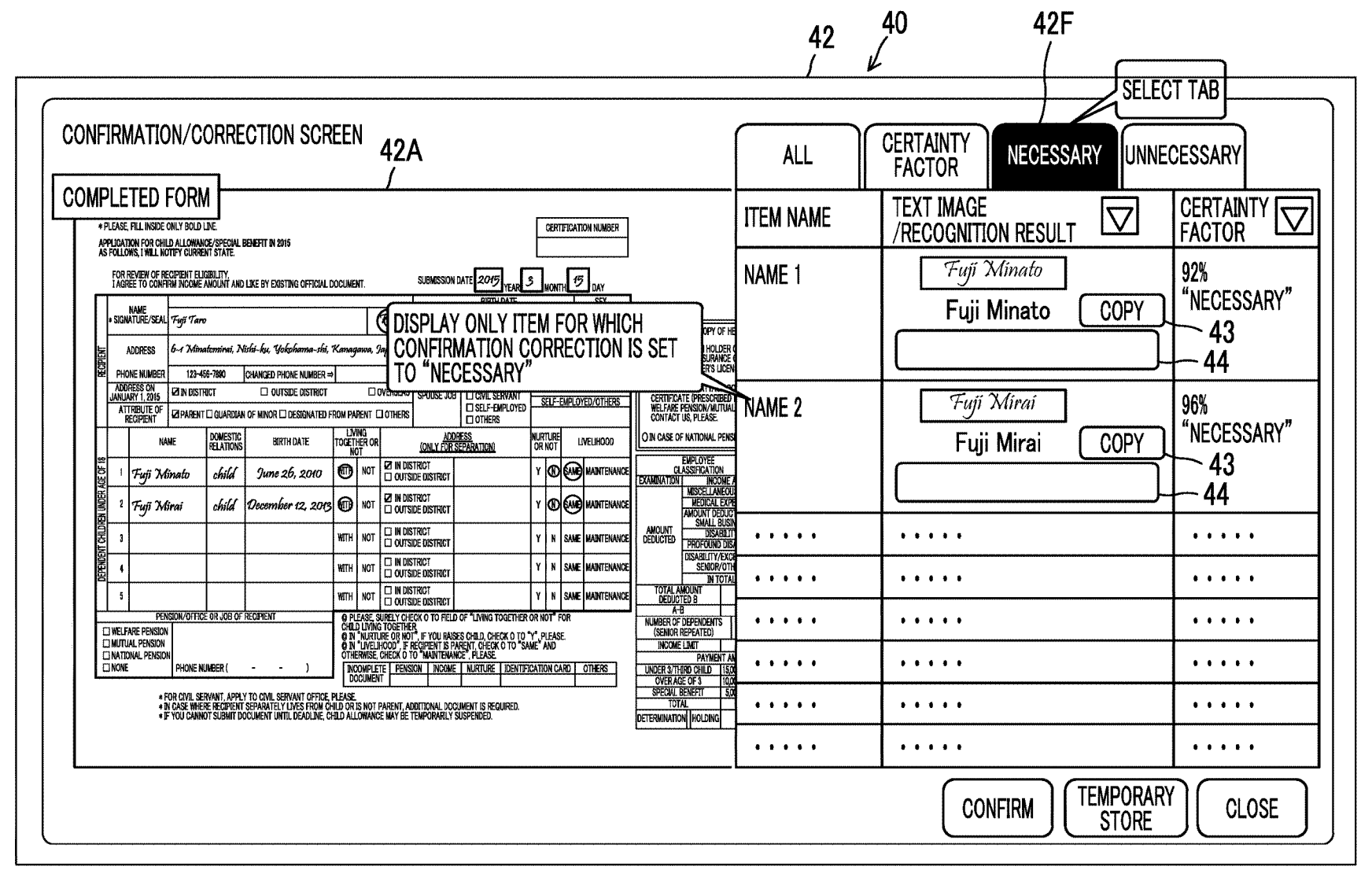

FIG. 14 is a front view illustrating still another example of the confirmation/correction screen 42 according to the present exemplary embodiment.

In the same manner as the example illustrated in FIG. 10, the confirmation/correction screen 42 illustrated in FIG. 14 is displayed on the confirmer terminal apparatus 40 and is a screen for the confirmer U performing a confirming operation of a recognition result.

The confirmation/correction screen 42 illustrated in FIG. 14 includes the preview image 42A of the completed form and a determination result list 42F. In the same manner as the example illustrated in FIG. 11, in the determination result list 42F, as examples of selectable tabs, "all", "certainty factor", "necessary", and "unnecessary" are displayed.

In the example illustrated in FIG. 14, a screen in a case where a tab of "necessary" is selected is illustrated and as items, "name 1 of a dependent child under the age of 18" and "name 2 of a dependent child under the age of 18" are displayed. In "name 1 of a dependent child under the age of 18", since "necessary" is set to "confirmation correction", the confirming operation is executed. For this reason, a corresponding item image ("Fuji Minato" in the example illustrated in FIG. 14), an item recognition result ("Fuji Minato" in the example illustrated in FIG. 14) by the OCR process, and a correction input field 44 of the item recognition result are displayed. In addition, in "name 2 of a dependent child under the age of 18", since "necessary" is set to "confirmation correction", the confirming operation is executed. For this reason, a corresponding item image ("Fuji Mirai" in the example illustrated in FIG. 14), an item recognition result ("Fuji Mirai" in the example illustrated in FIG. 14) by the OCR process, and a correction input field 44 of the item recognition result are displayed. That is, in a list of the item for which the confirming operation is determined to be necessary, the item image for each of the items, the item recognition result by the OCR process, and the correction input field 44 of the item recognition result are displayed.

Here, the confirmation processing unit 240 according to the present exemplary embodiment may perform control to determine that the confirming operation is necessary according to the confirmation necessity information and display a copy button 43 for the item of which a certainty factor is equal to or larger than a threshold value, as an example, as illustrated in FIG. 14. The copy button 43 is a button for copying the item recognition result ("Fuji Minato" and "Fuji Mirai" in the example illustrated in FIG. 14) by the OCR process to the correction input field 44. In this case, by the confirmer U selectively operating the copy button 43, the item recognition result is automatically copied to the correction input field 44. For this reason, it is not necessary for the confirmer U to manually input the own confirmation result into the correction input field 44. The copy button 43 is not limited to the case of displaying the tab, and is applied to a case of displaying the list illustrated in FIG. 10 described above.

In addition, the confirmation processing unit 240 may perform control to arrange the items for which the confirming operation is determined to be necessary according to magnitude of the certainty factor. Specifically, the items for which the confirming operation is determined to be necessary may be arranged and displayed in ascending order of the certainty factors or in descending order of the certainty factors.

In a case of "certainty factor" in the determination result list 42F illustrated in FIG. 14, a setting of display or non-display is possible, so the display or non-display is capable of being set for a display of "certainty factor" and a display of "necessary" of each of the items.

Figure 15:
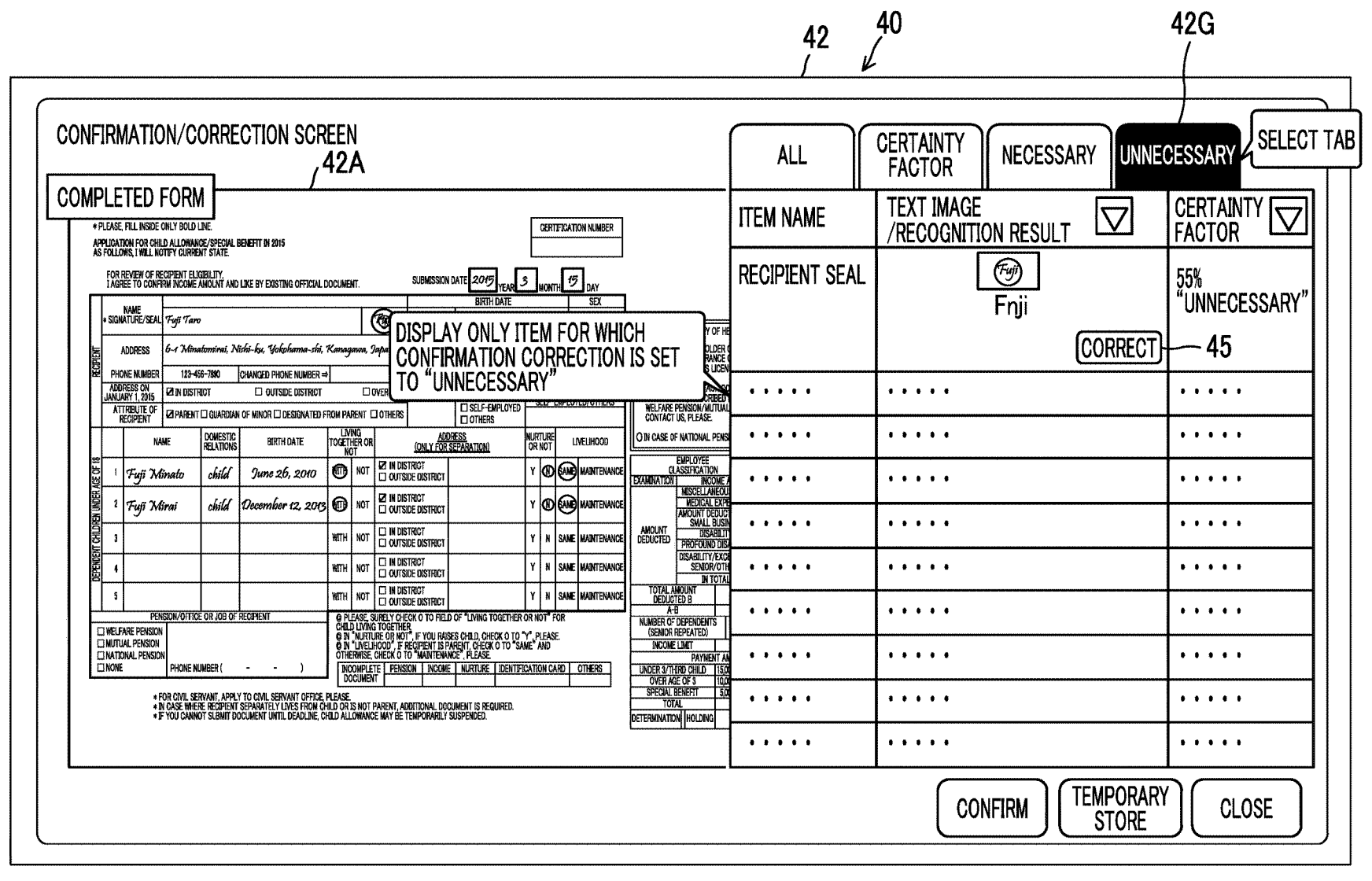

FIG. 15 is a front view illustrating still another example of the confirmation/correction screen 42 according to the present exemplary embodiment.

In the same manner as the example illustrated in FIG. 10, the confirmation/correction screen 42 illustrated in FIG. 15 is displayed on the confirmer terminal apparatus 40 and is a screen for the confirmer U performing a confirming operation of a recognition result.

The confirmation/correction screen 42 illustrated in FIG. 15 includes the preview image 42A of the completed form and a determination result list 42G. In the same manner as the example illustrated in FIG. 11, in the determination result list 42G, as examples of selectable tabs, "all", "certainty factor", "necessary", and "unnecessary" are displayed.

In the example illustrated in FIG. 15, a screen in a case where a tab of "unnecessary" is selected is illustrated and as an item, "recipient seal" is displayed. In "recipient seal", since "unnecessary" is set to "confirmation correction", the confirming operation is omitted. For this reason, a corresponding item image "Fuji" in the example illustrated in FIG. 15) and an item recognition result "Fnji" in the example illustrated in FIG. 15) by the OCR process are displayed, but a correction input field of the item recognition result is not displayed.

Here, the confirmation processing unit 240 according to the present exemplary embodiment may perform control to display a correction button 45 for the item for which the confirming operation is determined to be unnecessary according to the confirmation necessity information, as an example, as illustrated in FIG. 15. The correction button 45 is a button for displaying a correction input field of the item recognition result "Fnji" in the example illustrated in FIG. 15) by the OCR process. By the confirmer U selectively operating the correction button 45, as an example, as illustrated in FIG. 16 to be described below, a correction input field 46 of the item recognition result is displayed.

In addition, the confirmation processing unit 240 may perform control to arrange the items for which the confirming operation is determined to be unnecessary according to magnitude of the certainty factor. Specifically, in the same manner as the example illustrated in FIG. 14, the items for which the confirming operation is determined to be unnecessary may be arranged and displayed in ascending order of the certainty factors or in descending order of the certainty factors.

In a case of "certainty factor" in the determination result list 42G illustrated in FIG. 15, a setting of display or non-display is possible, so the display or non-display is capable of being set for a display of "certainty factor" and a display of "unnecessary" of each of the items.

Figure 16:
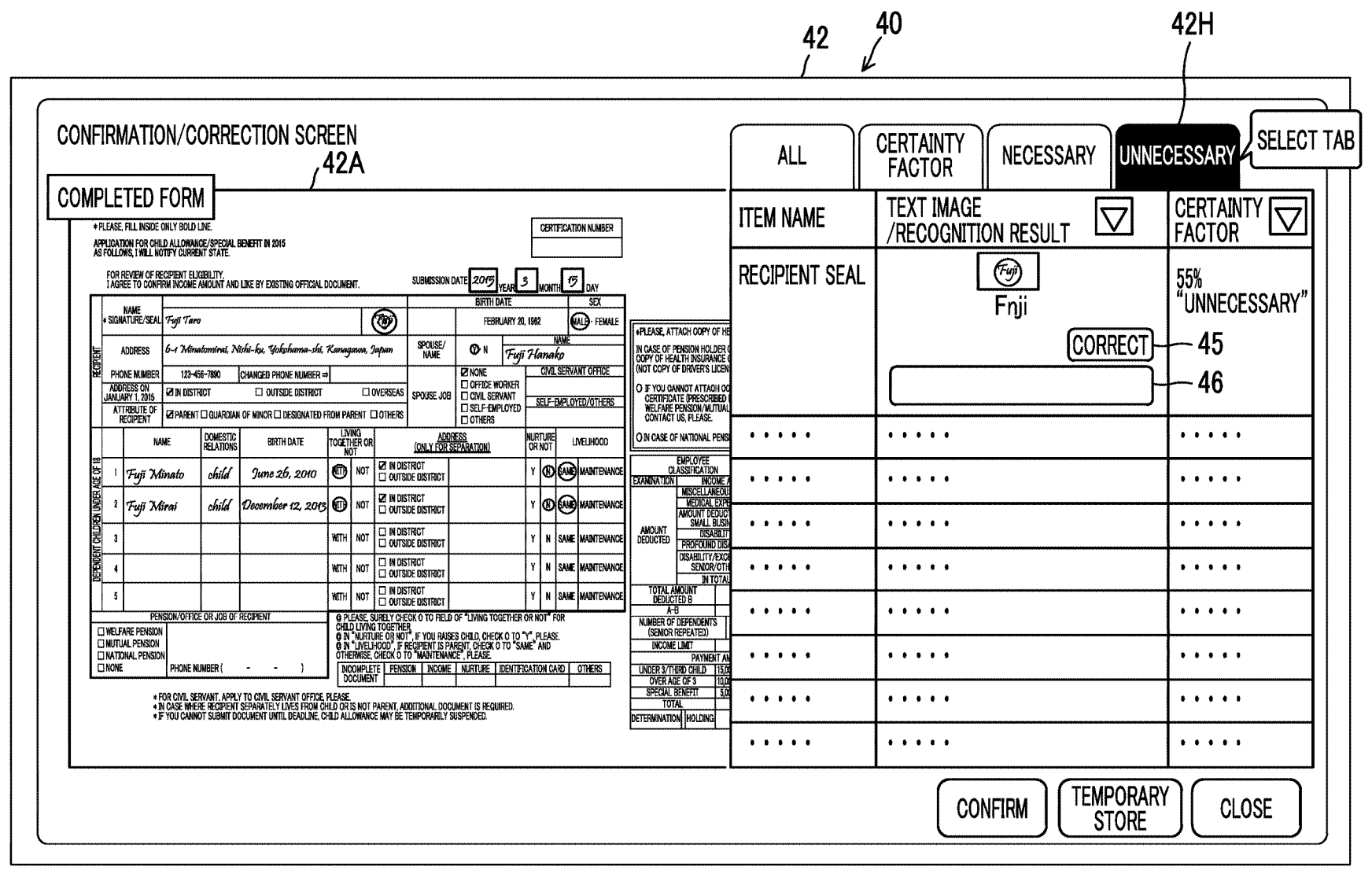

FIG. 16 is a front view illustrating still another example of the confirmation/correction screen 42 according to the present exemplary embodiment.

In the same manner as the example illustrated in FIG. 10, the confirmation/correction screen 42 illustrated in FIG. 16 is displayed on the confirmer terminal apparatus 40 and is a screen for the confirmer U performing a confirming operation of a recognition result.

The confirmation/correction screen 42 illustrated in FIG. 16 includes the preview image 42A of the completed form and a determination result list 42H. In the same manner as the example illustrated in FIG. 11, in the determination result list 42H, as examples of selectable tabs, "all", "certainty factor", "necessary", and "unnecessary" are displayed.

The example illustrated in FIG. 16 illustrates a state in which the correction input field 46 of the item recognition result is displayed in a case where the correction button 45 illustrated in FIG. 15 described above is selectively operated. In the example illustrated in FIG. 16, the correction button 45 is displayed for the item for which the confirming operation is determined to be unnecessary. As still another example, control may be performed to display the correction button 45 for the item for which the confirming operation is determined to be unnecessary and of which the certainty factor is smaller than a threshold value. That is, since there is a high possibility that the item recognition result is negative in a case where the certainty factor is relatively low, the correction button 45 is displayed. Since there is a high possibility that the item recognition result is positive in a case where the certainty factor is relatively high, the correction button 45 is not displayed The correction button 45 is not limited to the case of displaying the tab, and is applied to a case of displaying the list illustrated in FIG. 10 described above.

Next, a completed form which is a target of a confirming operation by the confirmer U will be described with reference to FIGS. 17 to 20.

FIG. 17 is a diagram illustrating an example of a completed form 70 according to the present exemplary embodiment.

The completed form 70 illustrated in FIG. 17 is displayed on the confirmer terminal apparatus 40 and is a target of the confirming operation by the confirmer U.

Figure 18:
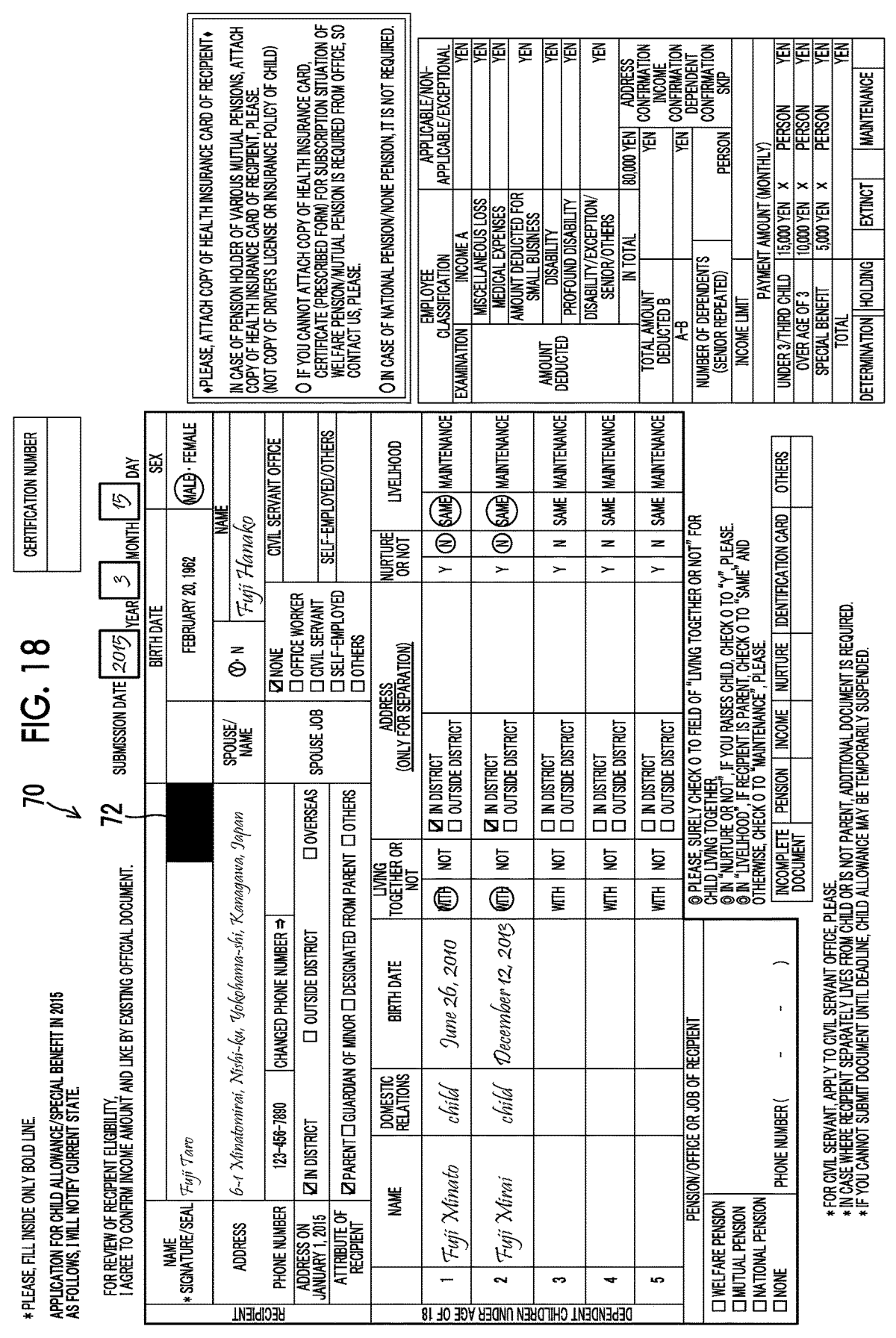

FIG. 18 is a diagram illustrating another example of the completed form 70 according to the present exemplary embodiment.

In the same manner as the example illustrated in FIG. 17, the completed form 70 illustrated in FIG. 18 is displayed on the confirmer terminal apparatus 40 and is a target of the confirming operation by the confirmer U.

In the completed form 70 illustrated in FIG. 18, a masking process is performed on an item 72 ("recipient seal" in the example illustrated in FIG. 18) for which the confirming operation is determined to be unnecessary. The masking process referred to here is, for example, a process of filling in black.

FIG. 19 is a diagram illustrating still another example of the completed form 70 according to the present exemplary embodiment.

In the same manner as the example illustrated in FIG. 17, the completed form 70 illustrated in FIG. 19 is displayed on the confirmer terminal apparatus 40 and is a target of the confirming operation by the confirmer U.

In the completed form 70 illustrated in FIG. 19, the masking process is performed on the item 72 ("recipient seal" in the example illustrated in FIG. 19) and an item 74 ("recipient name" in the example illustrated in FIG. 19) for which the confirming operation is determined to be unnecessary.

Figure 20:
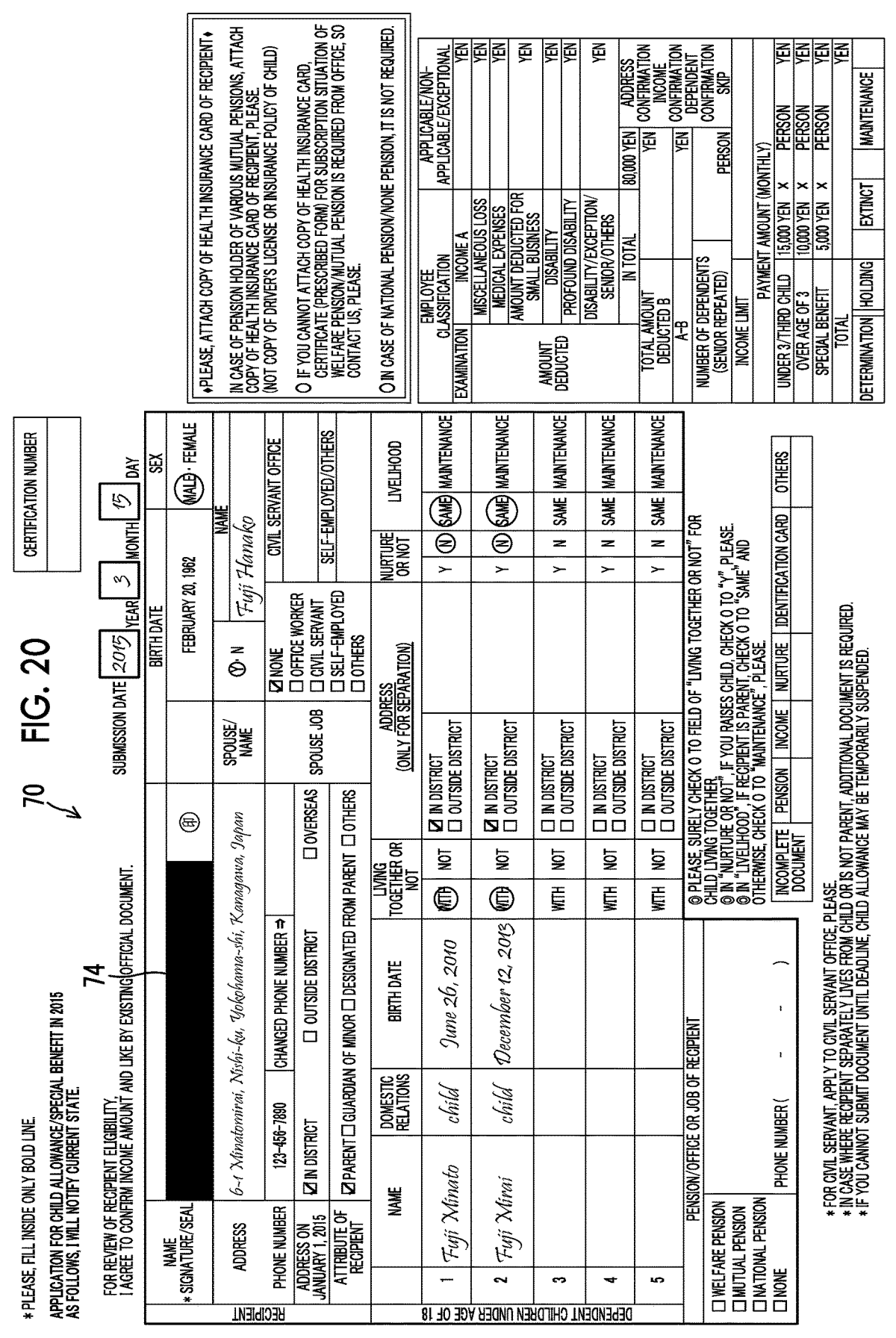

FIG. 20 is a diagram illustrating still another example of the completed form 70 according to the present exemplary embodiment.

In the same manner as the example illustrated in FIG. 17, the completed form 70 illustrated in FIG. 20 is displayed on the confirmer terminal apparatus 40 and is a target of the confirming operation by the confirmer U.

In the completed form 70 illustrated in FIG. 20, the masking process is performed on the item 74 ("recipient name" in the example illustrated in FIG. 20) for which the confirming operation is determined to be unnecessary.

Next, another action of the server apparatus 10 according to the present exemplary embodiment will be described with reference to FIG. 21.

Figure 21:
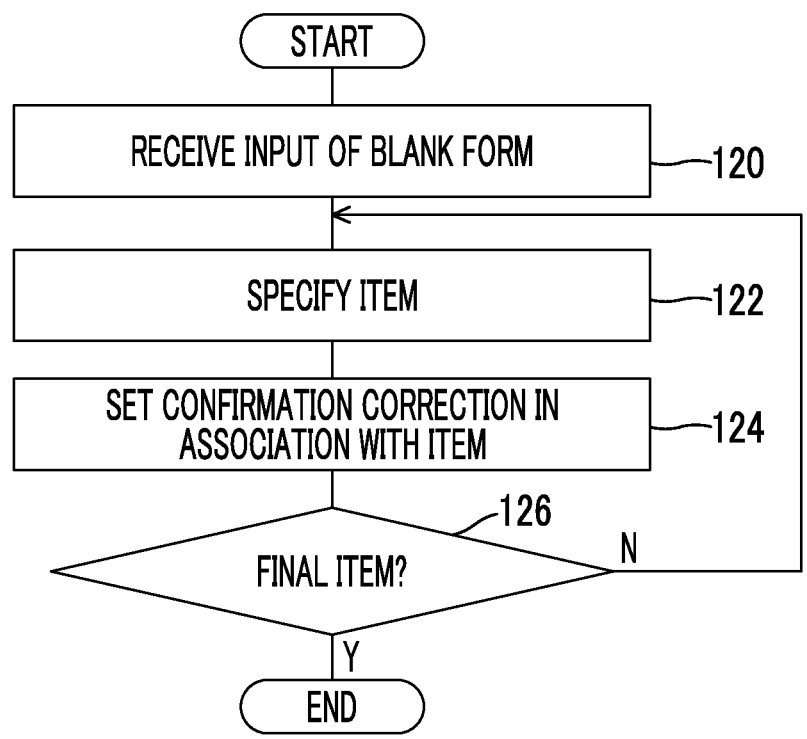
FIG. 21 is a flowchart illustrating an example of a flow of a recognition setting process by the confirmation processing program according to the exemplary embodiment.

FIG. 21 is a flowchart illustrating an example of a flow of a recognition setting process by the confirmation processing program 14A according to the present exemplary embodiment.

First, in a case where the server apparatus 10 receives an instruction of starting the recognition setting process for a blank form, the confirmation processing program 14A is activated and executes each of the following steps.

In step 120 in FIG. 21, the recognition setting unit 210 receives an input of the blank form.

In step 122, the recognition setting unit 210 specifies an item according to a predetermined order, as an example.

In step 124, the recognition setting unit 210 set confirmation correction in association with the item specified in step 122. In the present exemplary embodiment, as an example, the confirmation correction is set from the form definition screen 62 illustrated in FIGS. 5 to 7 described above.

In step 126, the recognition setting unit 210 determines whether or not the item is a final item. In a case where it is determined that the item is the final item (a case of positive determination), the recognition setting process by the confirmation processing program 14A is terminated and in a case where it is determined that the item is not the final item (a case of negative determination), the process returns to step 122 and the process is repeated.

According to the present exemplary embodiment, in a case where the plurality of items having different degrees of necessity of the confirming operation coexist in the form, the confirming operation is executed in an appropriate display mode according to the degree of necessity for each of the items. For this reason, the confirming operation is efficiently executed, and the number of steps of the confirming operation is reduced.

The server apparatus is described as an example of the information processing apparatus according to the exemplary embodiment. The exemplary embodiment may be provided in a form of a non-transitory computer readable medium storing a program for causing a computer to execute the function of each of the units included in the server apparatus. The exemplary embodiment may be provided in a form of a storage medium readable by a computer which stores the program.

In addition, the configuration of the server apparatus described in the exemplary embodiment described above is merely an example, and may be changed according to a situation within a range not deviating from the gist.

Further, a flow of the process of the program described in the exemplary embodiment is also an example and unnecessary steps may be deleted, new steps may be added, or the processing order may be exchanged within the range not deviating from the gist.

In addition, in the exemplary embodiment described above, the case where the process according to the exemplary embodiment is realized by a software configuration using a computer by executing the program, but the exemplary embodiment is not limited thereto. The exemplary embodiment may be realized by, for example, a hardware configuration or a combination of the hardware configuration and the software configuration.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor configured to
obtain image data and a recognition result, the image data being data obtained by digitizing a document including a plurality of areas in one document, the recognition result being a result obtained by recognizing the image data; and
perform a control to display an area image corresponding to each of the plurality of areas in the image data obtained and an area recognition result corresponding to each of the plurality of areas in the recognition result in accordance with a display mode predetermined according to a degree of necessity of a confirming operation corresponding to each of the plurality of areas,
wherein the processor is configured to further perform a control to display a correction input field of the area recognition result in addition to the area image and the area recognition result, for only an area for which the degree of necessity is determined to be equal to or larger than a certain value by a certainty factor indicating certainty of the area recognition result or confirmation necessity information indicating whether or not a confirming operation for the area recognition result is necessary,
wherein the processor is configured to further perform a control not to display the area image and the area recognition result, for an area for which the degree of necessity is determined to be smaller than the certain value by the certainty factor or the confirmation necessity information.

2. The information processing apparatus according to claim 1,
wherein the degree of necessity is represented by using the certainty factor.

3. The information processing apparatus according to claim 2,
wherein the processor is configured to obtain confirmation necessity information indicating whether or not a confirming operation for the area recognition result is necessary, and
the degree of necessity is represented by using the confirmation necessity information.

4. The information processing apparatus according to claim 1,
wherein the processor is configured to obtain confirmation necessity information indicating whether or not a confirming operation for the area recognition result is necessary, and
the degree of necessity is represented by using the confirmation necessity information.

5. The information processing apparatus according to claim 1,
Wherein the processor is configured to further perform a control to display a copy button for copying the area recognition result to the correction input field, for an area for which the confirming operation is determined to be necessary and of which the certainty factor is equal to or larger than a threshold value.

6. The information processing apparatus according to claim 5,
wherein the processor is configured to further perform a control to display a correction button for displaying the correction input field of the area recognition result, for an area for which the confirming operation is determined to be unnecessary by the confirmation necessity information and of which the certainty factor is smaller than a threshold value.

7. The information processing apparatus according to claim 1,
wherein the processor is configured to further perform a control to display a correction button for displaying the correction input field of the area recognition result, for an area for which the confirming operation is determined to be unnecessary by the confirmation necessity information and of which the certainty factor is smaller than a threshold value.

8. The information processing apparatus according to claim 1,
wherein the processor is configured to further perform a control to classify the area for which necessity of the confirming operation is determined in accordance with the degree of necessity and collectively display all of the areas.

9. The information processing apparatus according to claim 8,
wherein the processor is configured to further perform a control to classify and display the area for which necessity of the confirming operation is determined for each of types of a method of the confirming operation determined according to the degree of necessity.

10. The information processing apparatus according to claim 9,
wherein the processor is configured to further perform a control to arrange the area by using a certainty factor indicating certainty of the area recognition result for each of the classified and displayed types of the method of the confirming operation.

11. The information processing apparatus according to claim 8,
wherein the processor is configured to further perform a control to arrange the area in order in which the confirming operation is required according to the degree of necessity.

12. The information processing apparatus according to claim 11,
wherein the order in which the confirming operation is required is any one of ascending order of certainty factors for the respective areas and descending order of importance for the respective areas.

13. The information processing apparatus according to claim 11,
wherein the processor is configured to further perform a control to display an area for which the confirming operation is determined to be necessary before an area for which the confirming operation is determined to be unnecessary, as the order in which the confirming operation is required.

14. A non-transitory computer readable medium, storing a program causing an information processing apparatus comprising a processor to implement functions comprising:
obtaining image data and a recognition result, the image data being data obtained by digitizing a document including a plurality of areas in one document, the recognition result being a result obtained by recognizing the image data;
performing a control to display an area image corresponding to each of the plurality of areas in the image data obtained and an area recognition result corresponding to each of the plurality of areas in the recognition result in accordance with a display mode predetermined according to a degree of necessity of a confirming operation corresponding to each of the plurality of areas;
performing a control to display a correction input field of the area recognition result in addition to the area image and the area recognition result, for only an area for which the degree of necessity is determined to be equal to or larger than a certain value by a certainty factor indicating certainty of the area recognition result or confirmation necessity information indicating whether or not a confirming operation for the area recognition result is necessary; and
performing a control not to display the area image and the area recognition result, for an area for which the degree of necessity is determined to be smaller than the certain value by the certainty factor or the confirmation necessity information.

15. The non-transitory computer readable medium according to claim 14, wherein the degree of necessity is represented by using the certainty factor.

16. The non-transitory computer readable medium according to claim 15, wherein the functions further comprising: obtaining confirmation necessity information indicating whether or not a confirming operation for the area recognition result is necessary,
wherein the degree of necessity is represented by using the confirmation necessity information.

17. The non-transitory computer readable medium according to claim 14, wherein the functions further comprising: obtaining confirmation necessity information indicating whether or not a confirming operation for the area recognition result is necessary,
wherein the degree of necessity is represented by using the confirmation necessity information.

* * * * *